United States Patent
Hatakeyama et al.

(10) Patent No.: US 6,873,975 B1
(45) Date of Patent: Mar. 29, 2005

(54) CONTENT USAGE CONTROL SYSTEM, CONTENT USAGE APPARATUS, COMPUTER READABLE RECORDING MEDIUM WITH PROGRAM RECORDED FOR COMPUTER TO EXECUTE USAGE METHOD

(75) Inventors: Takahisa Hatakeyama, Kanagawa (JP); Makoto Yoshioka, Kanagawa (JP); Yuji Miyazawa, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/521,646

(22) Filed: Mar. 8, 2000

(30) Foreign Application Priority Data

Apr. 6, 1999 (JP) .......................................... 11-099482

(51) Int. Cl.[7] .............................. G06F 17/60; H04L 9/00
(52) U.S. Cl. ......................... 705/51; 705/57; 380/259; 380/287; 380/59; 713/182; 713/189; 713/193; 713/194; 713/200
(58) Field of Search .............................. 705/51, 54, 57; 380/259, 287; 713/182, 189

(56) References Cited

U.S. PATENT DOCUMENTS

| | | | |
|---|---|---|---|
| 5,339,403 A | 8/1994 | Parker | 395/425 |
| 5,392,351 A | 2/1995 | Hasebe et al. | 380/4 |
| 5,530,235 A | 6/1996 | Stefik et al. | |
| 5,555,304 A | 9/1996 | Hasebe et al. | 380/4 |
| 5,629,980 A * | 5/1997 | Stefik et al. | 705/54 |
| 5,634,012 A | 5/1997 | Stefik et al. | |
| 5,638,443 A | 6/1997 | Stefik et al. | |
| 5,715,403 A | 2/1998 | Stefik | |
| 5,796,824 A | 8/1998 | Hasebe et al. | 380/4 |
| 5,832,083 A * | 11/1998 | Iwayama et al. | 705/51 |
| 6,233,684 B1 | 5/2001 | Stefik et al. | |
| 6,236,971 B1 | 5/2001 | Stefik et al. | |
| 6,253,193 B1 * | 6/2001 | Ginter et al. | 705/52 |

FOREIGN PATENT DOCUMENTS

| | | |
|---|---|---|
| JP | 63-182758 | 7/1988 |
| JP | 3-68024 | 3/1991 |
| JP | 5257816 | 10/1993 |
| JP | 5-257816 | 10/1993 |
| JP | 7-319691 | 12/1995 |
| JP | 8-069419 | 3/1996 |
| JP | 8-286904 | 11/1996 |
| JP | 9-106376 | 4/1997 |
| JP | 9134311 | 5/1997 |
| JP | 9-190236 | 7/1997 |

OTHER PUBLICATIONS

Digital Information Logistics Architecture "Mediashell" and Its Billing and Utilizing Management; Author: Itaru Hosomi, Masayuki Nakae and Shunji Ichiyama; Human Media Res. Labs., NEC Corp; Publication Date: Sep. 19, 1998.

Survey of Data Base System: Author: C.J. Date; Publication Date: Mar. 25, 1997; Publisher: Maruzen Co., Ltd.

"Personal Computer ID Declaration" Nikkei Electronics No. 740; Publication Date: Apr. 5, 1991: Publisher: Nikkei Business Publications, Inc.

* cited by examiner

Primary Examiner—James P. Trammell
Assistant Examiner—Daniel L. Greene
(74) Attorney, Agent, or Firm—Greer, Burns & Crain, Ltd.

(57) ABSTRACT

A content usage control system comprises a copyright holder system, content server, license server and user system. The ACL setting section of the copyright holder system sets a license ACL expressed as a structure by a combination of logic sums and logic products of a plurality of partial licenses for the content, based on the user ID and a plurality of physical element IDs including media used in the user system, and stores the license ACL in an access control list. The license server controls the usage of the content by the user utilizing the access control list.

16 Claims, 23 Drawing Sheets

FIG.3

| ACCOUNT CONDITION VALUE | USAGE STATE |
|---|---|
| Max Count : MAXIMUM NUMBER OF OPERABLE SESSIONS | count : COUNT OF NUMBER OF OPERATIONS COMPLETE |
| Max Length : MAXIMUM READ LENGTH | totalLen : READ LENGTH PLUS REQUESTED READ LENGTH |
| max TimeLen : MAXIMUM EXECUTABLE TIME | totalTime : EXECUTED TIME LENGTH |
| max Debt : CREDIT LINE (CHARGING CONDITION) | debt : OUTSTANDING AMOUNT(DEBT WHEN NEGATIVE) |

| PHYSICAL ENVIRONMENT SPECIFYING ELEMENT (PCSUE) CONDITION | PHYSICAL ELEMENT ID CLASS (PCSUE-IDClass) |
|---|---|
| (1) COMPUTER BODY | PSN (PROCESSOR SERIAL NUMBER) |
| (2) PERIPHERAL DEVICES | DSN : DEVICE TYPE, SERIAL NUMBER |
| (3) MEDIA | MSN : MEDIA TYPE, SERIAL NUMBER |
| (4) IC CARD | certificates : CERTIFICATES ISSUED BY IC CARD |
| (5) HUMAN BODY PARTS (FINGERPRINTS, IRIS, etc.) | body Parts : BODY PARTS (FINGERPRINTS, IRIS, etc.) AUTHENTICATION INFORMATION |
| (6) PERMITTED TIME ZONE | time Period : TIME POINT (LOCAL CLOCK, GPS, etc.) |
| (7) NETWORK DOMAIN | MACAddress : MAC ADDRESS |
| (8) GEOGRAPHICAL POSITION (COUNTRY OF USAGE, etc.) | location : GPS/PHS DETECTION POSITION |
| (9) HUMAN MEMORY | user-ID WithPwd : USER'ID AND PASSWORD |
| (10) GROUP | group : SET OF PHYSICAL ELEMENT IDS |

FIG.16

| | APPLICATION LAYER | DEVICE DRIVER LAYER | DEVICE LAYER |
|---|---|---|---|
| GENERATION OF USAGE ENVIRONMENT SPECIFYING PHYSICAL ELEMENT OWNERSHIP CERTIFICATE | — | ○ | ◎ |
| AUTHENTICATION OF USAGE ENVIRONMENT SPECIFYING PHYSICAL ELEMENT ID | ○ | — | — |
| SEARCH OF ACCESS CONTROL LIST | ○ | — | ○ |
| PROTECTION OF ACCORDING INFORMATION | △ | — | ◎ (IC CARD) |
| CONDITIONAL ACCESS PERMISSION | ○ | — | ○ |
| DECODE | ○ | — | ○ |

— : INCORPORATION NOT SO MEANINGFUL
△ : DANGEROUS
○ : PROTECTION NOT TIGHT FOR PROFESSIONAL
◎ : PROTECTION TIGHT

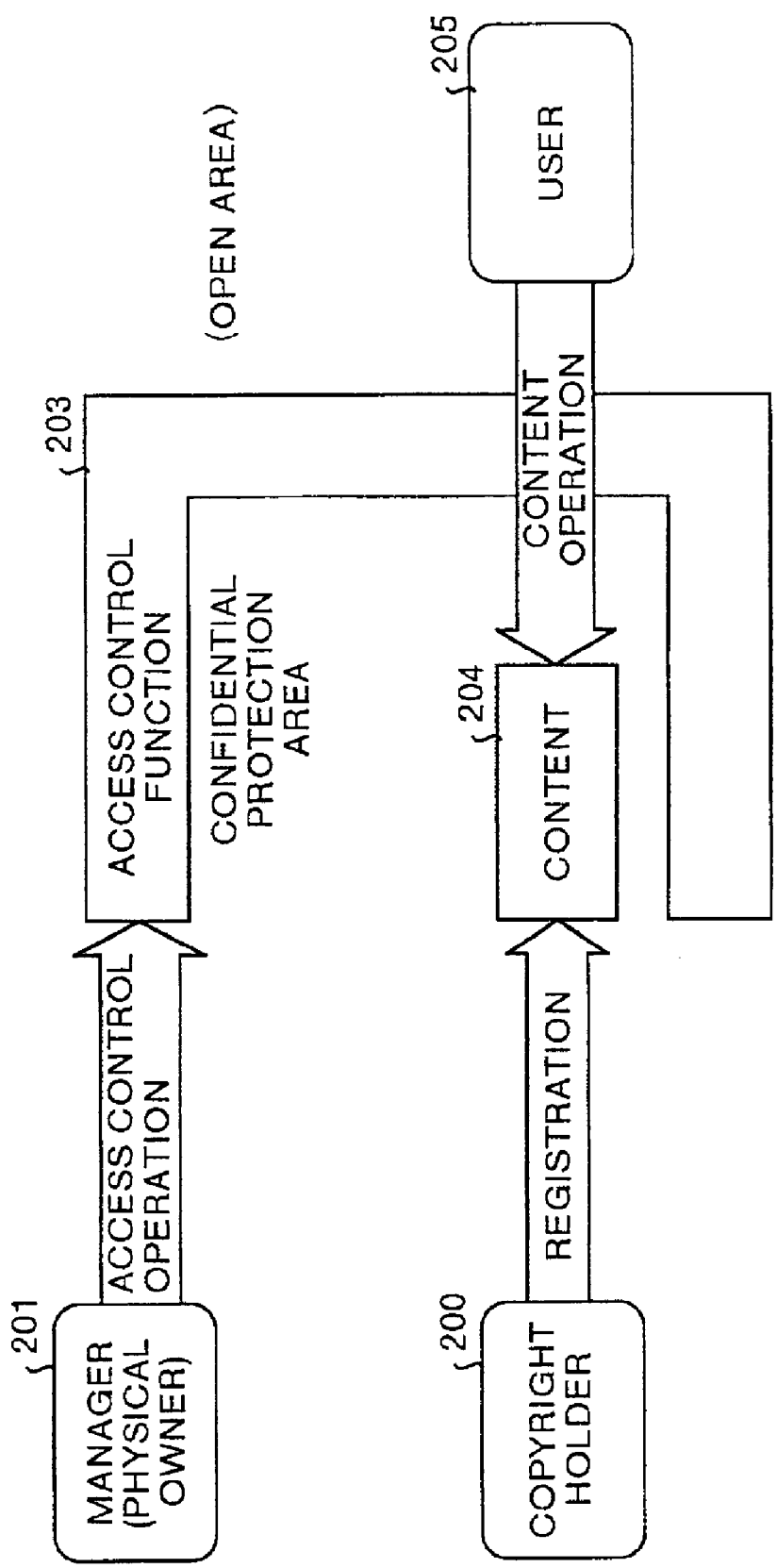

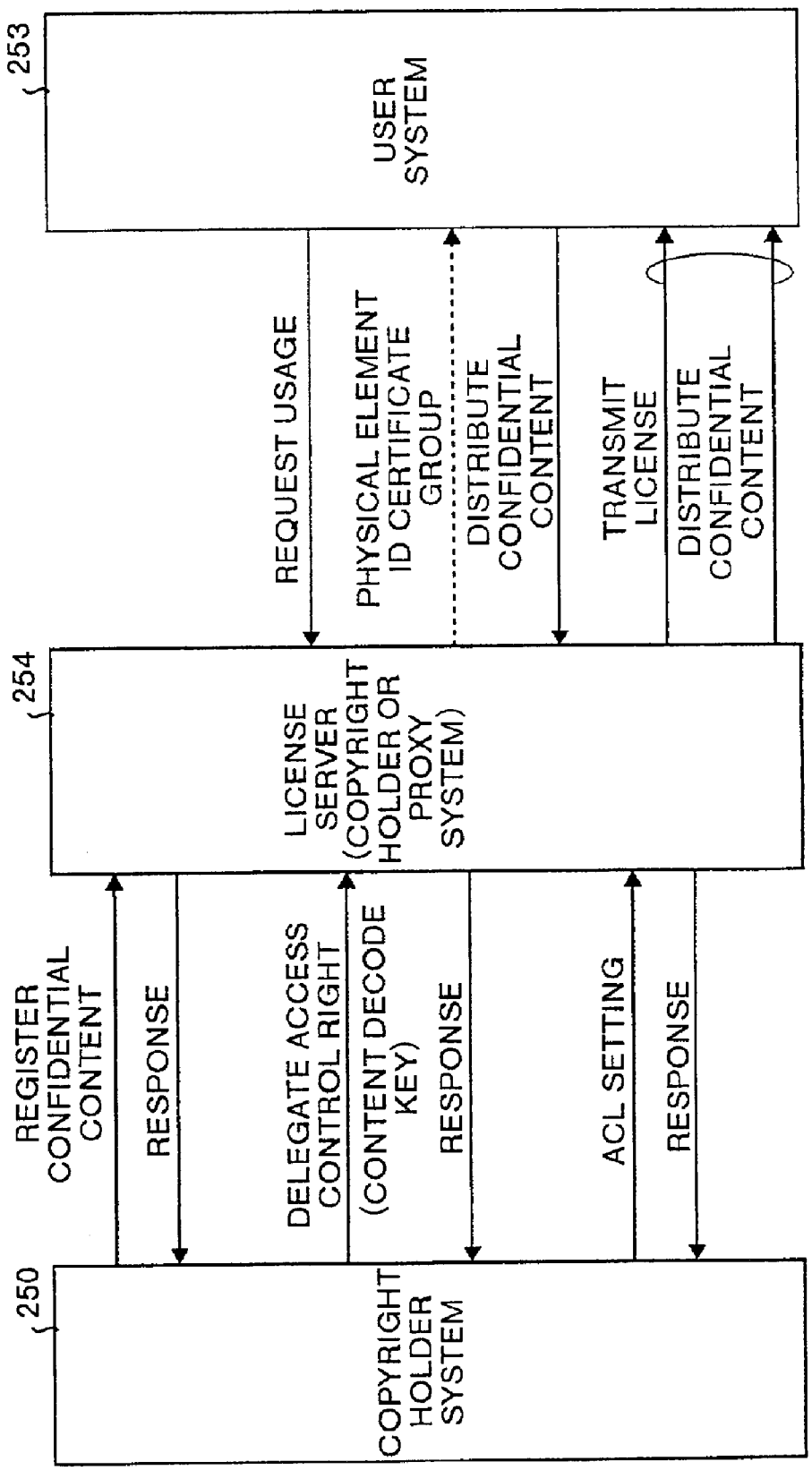

CONTENT USAGE CONTROL SYSTEM, CONTENT USAGE APPARATUS, COMPUTER READABLE RECORDING MEDIUM WITH PROGRAM RECORDED FOR COMPUTER TO EXECUTE USAGE METHOD

FIELD OF THE INVENTION

The present invention relates to a content usage control system for controlling the usage of the content supplied by the persons having the right to supply information such as copyright holders through an open network, a content usage apparatus. This invention also relates to a computer readable recording medium with a program recorded therein for the computer to execute a usage method.

BACKGROUND OF THE INVENTION

The currency plays a role in supplying the people with an award fairly in accordance with the property of the current as a material. The object called the currency is not a mere common oral concept, but a physical object, the essential conditions of which is portability and the difficulty to forge by other than the source. The physical property and the portability makes it possible to confirm the value of the currency among the users, while the difficulty of forging permits the source to control the fair chance of confirmation. With the recent development of the industry and technologies, however, the days are numbered before the difficulty to forge the currency is collapsed. A new object to confirm the value other than the currency is required. Such an object is also required to be physical, portable and difficult to forge. Further, it is required to be accessed and controlled by the source.

In addition to the security requirement described above, demand is rising for realization of "massive distribution" due to the multiplication of distribution and the increased capacity and speed of information. The environment that realizes the "massive distribution" satisfies the following conditions:
(1) The information users can acquire digital information substantially free of charge.
(2) The information suppliers can define the conditions for permitting the usage of the information (charge, change in conditions for usage, etc.) and forcibly execute the conditions agreed by the users.
(3) The additional operation required for the information users to use the service is at most "to confirm the access conditions".

A system that can execute the access control of the massive distribution accurately and safely is expected to contribute to the correction of unfair collection of the royalty such as the license fees. In the current system, the supplier cannot gain a profit unless a copyrighted object sells in a considerable amount. However, a system is required for permitting the copyright holders to gain the profit accurately. It is also necessary that the consideration is fairly distributed in an amount according to the service fees offered by all the persons involved including the professional artists and designers creating parts.

Conventionally, in controlling the access to content such as copyrighted objects in a distribution system environment, and especially on an open network, it has been the practice to store the content in a server accessible by the users of the content, and to control the usage of the content by controlling the access to the server. The content are defined herein as digital content having a structure as a mass of bit strings recordable in a storage medium and include documents and texts, images, animation, program software, etc.

FIG. 17 is a diagram showing an example of the conventional model of access control. As shown in FIG. 17, content 204 can be operated from a user 205 only through an access control function 203. Further, a copyright holder 200 simply registers the content 204, for example, in a server protected by the access control function 203, so that the access to the access control function 203 is controlled by a person other than the copyright holder 200 such as a manager of the server.

Specifically, as shown in FIG. 18, a server system 212 for holding the content is managed by a server operator system 211 and further managed and operated by the manager 201. The server operator system 211 registers the copyright holder and the users in the server system 212, and for this purpose, produces a directory and gives a permission for the copyright holder to control the access. A copyright holder system 210 causes the content of the copyrighted objects of the copyright holder to be stored in the server system 212 and set the access control conditions (ACL) in the server system 212. In this case, the copyright holder is required to be granted a permission for controlling the access to the server system 212. The user system 213, on the other hand, when using the content, requests the server system 212 to send the content, and in the case where the ACL is satisfied, acquires the content stored in the server system 212.

When the content user is entirely authorized, however, a change of the user due to the relocation or copying (duplication) makes the authorization of the copyright holder fail to cover the content relocated or copied, as the case may be. Further, no forcible execution of the license for access to the objects has been defined between the server manager storing the content of the objects of the copyright and the copyright holder. For example, it has been considered a matter of course for the server manager to change the accessibility without permission of the copyright holder.

On the other hand, a distribution system environment has been promoted by price reduction of storage media, etc. to such an extent that the network traffic is not concentrated but content can be distributed to a plurality of servers in cache, thus making possible fast access to content objects. As a result, the access control model as shown in FIG. 17 requires the construction of a firm access control function only at the entrance to the operation of the content by the user 205, while an omnidirectional access control or security is required in the distributed system environment described above.

In view of this, an access control model as shown in FIG. 19 has been conceived. This access control model is divided into a copyright holder protection area where the copyright holder 200 can be protected by the conventional security technique, an open area where all external attacks are accepted, and a confidential protection area where the hardware and software are protected against alteration and duplication of digital data. The confidential protection area is protected by an omnidirectional access control function 221 in which the content 222 are stored.

The copyright holder 200 can register the content 222 and control the access to the access control function 221. The user 205 can acquire the content 222 through the access control function 221 from the open area. An inter-area protection interface 220 is for protecting the zone between the copyright holder protection area and the open area.

A specific example of the access control model in the distributed system environment shown in FIG. 19 is described in U.S. Pat. No. 5,339,403. Japanese Unexamined Patent Publication No. 9-134311 and U.S. Pat. Nos. 5,392, 351, 5,555,304 and 5,796,824 disclose a technique for preventing the illegal use of content by checking the equipment of the users. The conventional content usage control system will be described below with reference to these patent publications.

FIG. 20 is a diagram showing a content distribution model of the conventional content usage control system. A decode protection area and a reproduction protection area of FIG. 20 correspond to the confidential protection area shown in FIG. 18. The decode protection area is where the hardware and software are protected against alteration and the output data against duplication, and the reproduction protection area is where the digital decoded data are protected against duplication. Usage environment specifying physical elements (PCSUE) 235-1 to 235-N are physical elements for specifying the usage environment of the content, and specifically include a CPU, peripheral equipment, a removable storage medium, an IC card and the like.

In the decode protection area, the content 234 constituting a copy of the content 233 encrypted by the copyright holder 200 based on the certificates 236-1 to 236-N of the physical element ID corresponding to the PCSUE 235-1 to 235-N and existing in the server of the open area are decoded. The resulting compound content are used by the users through the reproduction protection area. Thus, the content are encrypted (content 233) by a key corresponding to a physical element ID. For decoding the content 234 corresponding to the content 233, each physical element ID or a corresponding confidential key is required.

The content distribution model includes a license simultaneous model for distributing the license used for decoding the encrypted content and the encrypted content at the same time, a content cacheable model for storing the encrypted content in the cache of the server and acquiring them at a time separate from the license. FIG. 21 is a diagram showing the content cacheable model.

As shown in FIG. 21, first, the copyright holder 200 produces and encrypts the content in the copyright holder protection area, after which the content are duplicated and cached in the server of the open area. The certificates 241-1 to 241-N encrypted from the physical element IDs of the PCSUE 235-1 to 235-N, on the other hand, are output to the copyright holder protection area in encrypted form. A confidential key Kp is retrieved from a user physical object class corresponding to the PCSUE 235-1 to 235-N. Based on the confidential key Kp and the certificates 241-1 to 241-N, the physical element IDs 243-1 to 243-N are decoded and used for encrypting the content decode key Kc, which are output to the confidential protection area.

In the confidential protection area, the encrypted content decode key Kc is decoded with the physical element IDs 242-1 to 242-N thereby to obtain a content decode key Kc. The encrypted content 234 that can be acquired from the open area are decoded using the content decode key Kc, and offered as content 244 for use by the user 205.

FIG. 22 is a block diagram showing a general configuration of content usage control system corresponding to the content cacheable model shown in FIG. 21. As shown in FIG. 22, a copyright holder system 250 exists in the copyright holder protection area, a content server 251 exists in the open area, and a license server 252 and a user system 253 exist in the confidential protection area. The copyright holder system 250 encrypts the content thus produced, and the confidential content thus encrypted are stored in the content server 251.

Further, the content decode key Kc is sent to the license server 252, thus delegating the access control right to the license server 252. Further, an access control list (ACL) is set. The user system 253 sends a request to use the content to the license server 252. A group of the certificates of the physical element IDs, if not attached, are acquired upon designation by the license server 252 of the conditions for the physical elements. The certificates thus acquired are sent out to the license server 252.

The license server 252, as shown in FIG. 21, acquires the confidential key Kp of the physical object class of the user, and decodes the group of the certificates of the physical element IDs. The content decode key Kc encrypted by the decoded physical element ID is sent to the user system 253 as a license L. As a result, as far as the physical element ID of the user system 253 is coincident, the content decode key Kc is decoded, and the confidential content can be decoded by use of the content decode key Kc thus decoded.

In view of the fact that the confidential content are stored in the content server 251, the user system 253 is required to receive the distribution of the confidential content from the content server 251 by separately requesting the distribution thereof from the content server 251.

On the other hand, FIG. 23 is a block diagram showing a general configuration of a content usage control system for realizing a content simultaneous distribution model. In FIG. 23, the content server 251 is not existent, so that the confidential content are sent to the user system 253 simultaneously with the license. As shown in FIG. 22, the confidential content are transported to a server temporally in the vicinity of the user system 253, and therefore, for acquiring the confidential content through the content server 251, the user system 253 only requests the usage of the content whenever required.

Further, as compared with the content simultaneous distribution model, the proper selection of the distribution route of the content is made possible, and therefore the response time can be shortened for the user intending to acquire the content. Further, the content cacheable model has many advantages. For example, the content can be distributed in advance, separate from the license, by use of the base of the ROM medium, the broadcast or the caches in the proxy server.

In the conventional content usage control system described above, a device coincident with the physical element ID unique to the user system can basically decode the confidential content and use the content. In view of the fact that the license (conditions for permission of usage) is produced based only on the physical element ID, however, it is impossible to add the conditions for limiting the frequency of reading the content as determined by the intention of the copyright holder, to set a time limit, or to define the charging conditions. Thus, the versatile control of the content usage has been impossible.

Further, the usage environment specifying physical element is not always simplified in configuration. With a device having a complicated configuration, a specified section or part of such a device may be illegitimate. Then, even in the case where the license is produced from the usage environment specifying physical element constituting a simply large sized device, the illegitimacy may be overlooked for a deteriorated security.

SUMMARY OF THE INVENTION

It is an object of this invention to provide a content usage control system in which the persons authorized to supply information including those authorized by the information creator such as a copyright holder can control the content usage in versatile way, while at the same time preventing the illegal use of the content with high accuracy, a content usage apparatus, and a computer readable recording medium for recording a program enabling the computer to execute the method of using the content.

According to one aspect of the present invention, a setting unit sets a license as a structure expressed by combinations of logic sums and logic products of a plurality of partial licenses for the content based on the ID information of the physical elements of the user unit including the media used in the user unit and the ID information of the user, and a usage control unit controls the usage of the content by the user unit based on the license set by the setting unit, thereby making versatile usage control possible based on the license.

Further, the partial licenses set by the setting unit include the accounting conditions constituting the conditions for the category changing in accordance with the usage state of the user unit and the user, thereby making possible a more finely detailed usage control by the user.

Further, a production unit produces, at the content of the license information encrypted from the license and the content decode key by the ID information of a plurality of physical elements of the user unit including the media used in the user unit, and a user unit decodes the license information sent in accordance with the content usage request based on the ID information of the physical elements due to the user unit, so that in the case where the license conditions are satisfied, the encrypted content are decoded using the content decode key.

Further, in the case where the interface between the partial licenses in the license is described with the logic product, the encryption based on the ID information of the physical elements corresponding to the partial licenses is multiplied, thereby making it possible to distribute the risk of theft of the content decode key as a result of successful attack on a part of the physical elements.

Further, physical elements contained in a physical element are handled as a single physical element, of which the illegal use is not permitted, thereby making it possible to distribute the risk of theft of the content decode key.

Further, the content server holds the content encrypted by the authorized information supplier unit on the open network, and upon receipt of a request from the user unit for content distribution, sends the encrypted content to the user unit. As a result, the traffic jam is prevented in the system by making the most of the open network thereby making it possible to acquire the content quickly.

According to another aspect of the present invention, a setting unit sets by storing in the condition storage unit of the usage control unit the license conditions expressed as a structure by a combination of logic sums and logic products of a plurality of partial licenses for the content based on the ID information of the physical elements of the user unit including the media used in the user unit and the ID information of the user, and holds the decode key for the same content in the holding unit. The extraction unit receives the content usage request from the user unit, extracts the license conditions and the content decode key corresponding to the user unit, and based on the ID information of the physical elements sent from the user unit, produces the license conditions encrypted from the license conditions and the content decode key and sends the resulting license information to the user unit. The user unit decodes the license information sent thereto in accordance with the content usage request, based on the ID information of the physical elements due to the user unit and in the case where the license conditions are satisfied, decodes the encrypted content using the content decode key.

According to still another aspect of the present invention, a request unit transmits the ID information of the physical elements of the content usage apparatus and the ID information of the user to the content management device in accordance with the content usage request, after which the license information sent by the content management device in response to the content usage request are decoded based on the ID information of the physical elements of the content usage apparatus thereby to determine the license conditions and the content decode key, and when permitted upon determination of the particular license conditions, decodes the content using the decode key, thereby improving the protection ability.

According to still another aspect of the present invention, the ID information of the physical elements of the content usage apparatus involved and the ID information of the user are sent to the content management device for managing the content in response to the content usage request in the request step, followed by decoding the license information transmitted by the content management device in response to the content usage request, based on the ID information of the physical elements of the content usage apparatus thereby to determine the license conditions and the content decode key, after which the content are decoded by use of the decode key when permitted upon determination of the license conditions, thus improving the protection ability.

According to still another aspect of the present invention, first, the license conditions and the content decode key are determined by decoding the license information of the content in response to the content usage request, based on the ID information of the physical elements of the content usage apparatus, and when permitted upon determination of the license conditions, the content are decoded using the decode key, thereby improving the protection ability.

According to still another aspect of the present invention, the first step is for the license conditions and the content decode key to be determined by decoding the license information of the content in response to the content usage request, based on the ID information of the physical elements of the content usage apparatus, and then when permitted upon determination of the license conditions, the content are decoded using the decode key, thereby improving the protection ability.

Other objects and features of this invention will become apparent from the following description with reference to the accompanying drawings.

BRIEF DESCRIPTION OF THE DRAWINGS

FIG. 3 is a diagram showing an example of the accounting condition and the physical environment specifying element condition;

FIG. 16 is a diagram showing the effect that each processing procedure incorporated in each entity of the specified usage environment has on the protection ability;

FIG. 17 is a diagram showing an access control model according to the prior art;

FIG. 23 is a diagram showing a general configuration of the content usage control system for realizing the content simultaneous distribution model.

DESCRIPTION OF THE PREFERRED EMBODIMENT

A content usage control system, a content usage apparatus and a computer readable recording medium having recorded therein a program for enabling the computer to execute a method of using the content usage apparatus will be explained with reference to the accompanying drawings.

Figure 1:
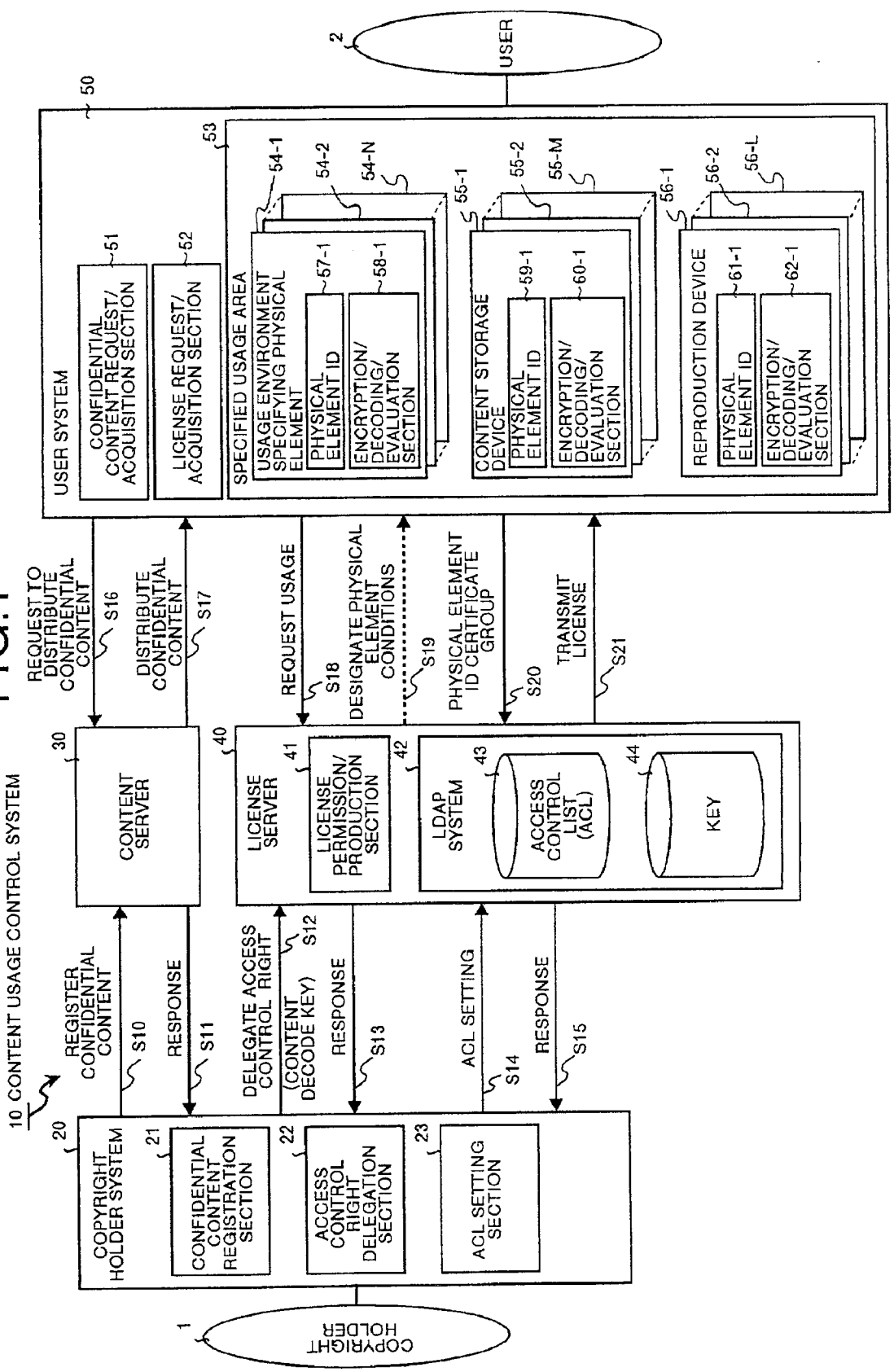
FIG. 1 is a diagram showing a configuration of a content usage control system according to an embodiment of the present invention.

FIG. 1 is a diagram showing a configuration of a content usage control system according to an embodiment of the invention. A content usage control system 10 shown in FIG. 1 is for controlling the usage by the user 2 of the content of a copyrighted object produced by a copyright holder 1. In FIG. 1, the content usage control system 10 roughly comprises a copyright holder system 20, a content server 30, a license server 40 and a user system 50.

The copyright holder system 20 includes a confidential content registration section 21 for performing the process of encrypting the content and registering the confidential content in the content server 30 (S10), an access control right delegation section 22 for delegating the access control right by sending to the license server 40 the content decode key required for decoding the encrypted content (confidential content) (S12) and an ACL setting section 23 for setting the usage permit conditions, i.e. the license (ACL) in the license server 40 (S14), thereby managing the usage control of the content of copyrighted objects.

The content server 30 registers the confidential content sent from the copyright holder system 20 and in response to a confidential content distribution request (S16) from the user system 50, sends out to the user system 50 the registered confidential content in encrypted form (S17).

The license server 40 includes a license permission/production section 41 and an LDAP system 42. In response to a content usage request from the user system 50 (S18), the license permission/production section 41 searches the LDAP system 42 for the physical element ID certificate added to the usage request and the corresponding decode key, decodes the physical element ID, searches for the content decode key corresponding to the content of which the usage is requested, and sends the license encrypted from the content decode key thus searched, by the physical element ID (S21).

This license is a physical environment specifying element condition and is structured in the form of a combination of logic sums and logic products corresponding to the structure of the physical elements. Further, according to this embodiment, the accounting condition based on the usage state of the user is also encrypted as an ACL as well as the physical environment specifying element condition conventionally used. This encryption and decoding of the license will be described later. In the case where the physical element ID certificate is not attached to the usage request (S18) nor is it available in the LDAP system 42, the physical element condition designation (S19) is sent to the user system 50 and the group of the physical element ID certificates produced by the user system 50 is returned (S20).

On the other hand, the content decode key, if sent by delegation of the access control right from the copyright holder system 20 (S12), is registered as an item corresponding to the confidential content in the data base of the key 44 in the LDAP system 42 described later. Further, the ACL setting, if sent from the copyright holder system 20 (S14), is stored as an item corresponding to the confidential content in an access control list (ACL) in the LDAP system 42.

The user system 50 includes a confidential content request/acquisition section 51 for requesting the distribution of the confidential content (S16) and acquiring the confidential content distributed, a license request/acquisition section 52 for requesting the license, i.e. the usage (S18) and processing the license acquisition (S21), and a specified usage environment (SUE) 53 for the user system. The specified usage environment 53 is defined as a specified content usage environment constituting general information including a CPU, peripheral equipment, a removable storage medium, an IC card, content usage state and the like.

The specified usage environment includes usage environment specifying physical elements (PCSUE) such as CPUs 54-1 to 54-N, content storage devices 55-1 to 55-M for storing the content, and reproduction devices 56-1 to 56-L such as players and viewers. Each of the PCSUEs 54-1 to 54-N, each of the content storage devices 55-1 to 55-M and each of the reproduction devices 56-1 to 56-L has physical element IDs 57-1 to 57-N, 59-1 to 59-M and 61-1 to 61-L, respectively, and also encryption/decoding/evaluation sections 58-1 to 58-N, 60-1 to 60-M and 62-1 to 62-L, respectively.

The encryption/decoding/evaluation sections 58-1 to 58-N, 60-1 to 60-M and 62-1 to 62-L encrypt each physical element with the physical element ID of the corresponding physical element, and decodes each physical element with the physical element ID of the corresponding physical element, further followed by the evaluation of the decoding result. In other words, each physical element ID is processed for each physical element not to leak information even on the interface between physical elements.

The process of operating the copyright holder system 20, the content server 30, the license server 40 and the user system will be explained primarily with reference to a flowchart. First, referring to the flowchart of FIG. 2, the internal processing procedures of the copyright holder system 20 will be explained.

Figure 2:
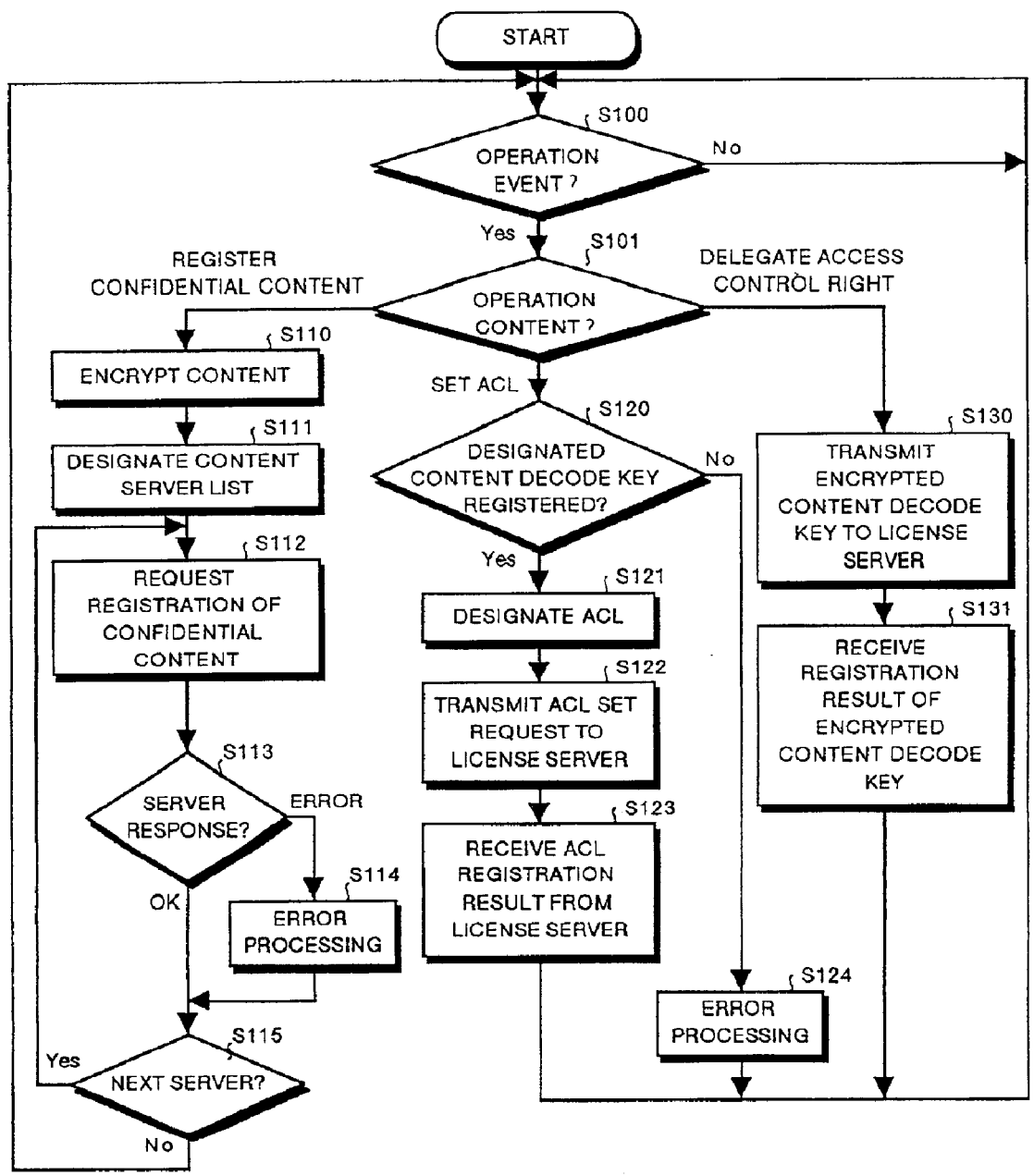
FIG. 2 is a flowchart showing the internal procedures of the process of a copyright holder system 20 shown in FIG. 1.

As shown in FIG. 2, the copyright holder system 20 first determines whether an operation event has occurred or not (step S100). In the case where no operation event has occurred (NO in step S100), the process is repeated until an operation event occurs. In the case where an operation event has occurred (YES in step S100), on the other hand, it is determined whether the content of the operation of the operation event is the registration of the confidential content, the ACL registration or the delegation of the right to control the access (step S101).

In the case where the content of the operation is the registration of the confidential content (confidential content registered in step S101), the confidential content registration section 21 encrypts the content (step S110), designates the desired content server 30 from the content server list (step S111), and requests the registration of the confidential content in the designated content server 30 (step S112). After that, upon receipt of a response from the content server 30, it is determined whether the particular response is OK or an error (step S113).

It is determined whether the next content server has been designated or not (step S115), directly in the case where the response from the content server 30 is OK, or after the error processing (step S114) in the case where the responses an error. In the case where the next content server is designated (YES in step S115), the process proceeds to step S112 and the above-mentioned steps are repeated. In the case where the next content server is not designated (NO in step S115), on the other hand, the process proceeds to step S100 for repeating the steps described above.

In the case where the content of operation are setting the ACL (set ACL in step 101), the ACL setting section 23 further determines whether the designated content decode key is registered or not (step S120), while in the case where the content key is not registered (NO in step S120), the error processing is conducted (step S124), followed by proceeding to step S100 for repeating the above-mentioned process. In the case where the content decode key is registered (YES in step S120), on the other hand, the ACL set request is sent to the license server 40 (step S122), and the ACL registration result is received from the license server 40 (step S123), after which the process proceeds to step S100 for repeating the steps described above.

In the case where the content of the operation are the delegation of the right to control the access (delegate the access control right in step S101), on the other hand, the encrypted content decode key is sent to the license server 40 (step S130), and the registration result of the encrypted content decode key is received (step S131), followed by proceeding to step S100 for repeating the same steps.

An explanation will be given of the ACL settings by the ACL setting section 23. FIG. 3 is a diagram showing an example of access conditions which are of two types including the accounting condition and the physical environment specifying element (PCSUE) condition. As shown in FIG. 3, the accounting condition which is one of the features of the present invention includes maxCount (maximum number of operable sessions) and the corresponding content usage state (number of completely operated sessions). The intention is to control, i.e. limit or approve the access by setting the limitation of the maximum number of operable sessions to a variable value in terms of the number of completely operated sessions.

The usage state of the content corresponding to the accounting condition value of the next maxLength (maximum read length) is totalLen (completely read length plus the read length to be requested), of which the intention is to control the access by the maximum read length of the content. The usage state of the content corresponding to the accounting condition value of the next maxTimeLen (maximum executable time) is totalTime (completely executed time length), of which the intention is to control the access by the maximum executable time of the content. The usage state of the content corresponding to the next accounting condition value of maxDebt (credit line (charging conditions)) is debt (outstanding amount). The outstanding amount, if negative in value, is a debt, the intention being to control the access by the charging conditions.

The physical environment specifying element condition is the computer body first of all, and the corresponding class of the physical element ID is PSN which is a processor serial number. The class is defined herein as an object class on the data base. The next class of the physical element ID corresponding to the peripheral devices is DSN indicating the type and the serial number of the devices. The next class of the physical element ID corresponding to the medium is MSN indicating the type and serial number of the medium. The next physical element ID corresponding to the IC card is "certificates", indicating the certificates issued by the IC card.

The next information on human body parts is the fingerprints or iris information, for example, and the corresponding class of physical element ID is bodyParts which is an authentication information of the human body parts. The next class of the physical element ID corresponding to the permitted time zone is timePeriod, which is the GPS time point on the local clock or global scale. The next network domain indicates the area on the network, and the corresponding class of the physical element ID is MACAddress indicating the MAC address. The next geographical position indicates the country of usage and the corresponding class of the physical element ID is "location" indicating the position detected by the GPS or PHS. The next class of the physical element ID corresponding to the human memory is user-ID WithPwd indicating the user ID and a password. The class of the physical element ID corresponding to the last group is "group" indicating a set of physical element IDs.

These access conditions are determined as a set having a logical combination of AND and OR, i.e. as an ACL. As described above, the access conditions include the accounting condition and the physical environment specifying element condition, which can be combined in arbitrary way. For example, an ACL is set as shown below.

udac#acl
read:((grop=sysrapOR group=soft4soft) AND
45661244<MSN<45661412) OR count<1;
modify:user=yujiOR user=hataOR
IC#card=1afd234fe4def458c3bac78497bbda6f;
print:group=sysrap;

According to the ACL set this way, "read" indicates the browsing condition, in which the group is "sysrap" or "soft4soft", and the media serial number MSN is over 45661244 and less than 45661412, or the number of completely operated sessions is less than one, that is to say, the content have never been used. Further, "modify" indicates the update condition, and the condition for updating the content is that the user name is "yuji" or "hata" or the number of "IC#card" is "1afd234fe4def458c3bac78497bbda6f".

Further, "print" indicates the print output condition, and only when the group is "sysrap", the content can be printed. This ACL can be set arbitrarily by the copyright holder 1 from the copyright holder system 20. This ACL setting improves the operability by using the GUI. The ACL type may also be set with the operation name. For example, the access condition (1) can be selected for the operation name 1, and the access condition (2) for the operation name 2, whereby the operability is further improved.

Figure 4:
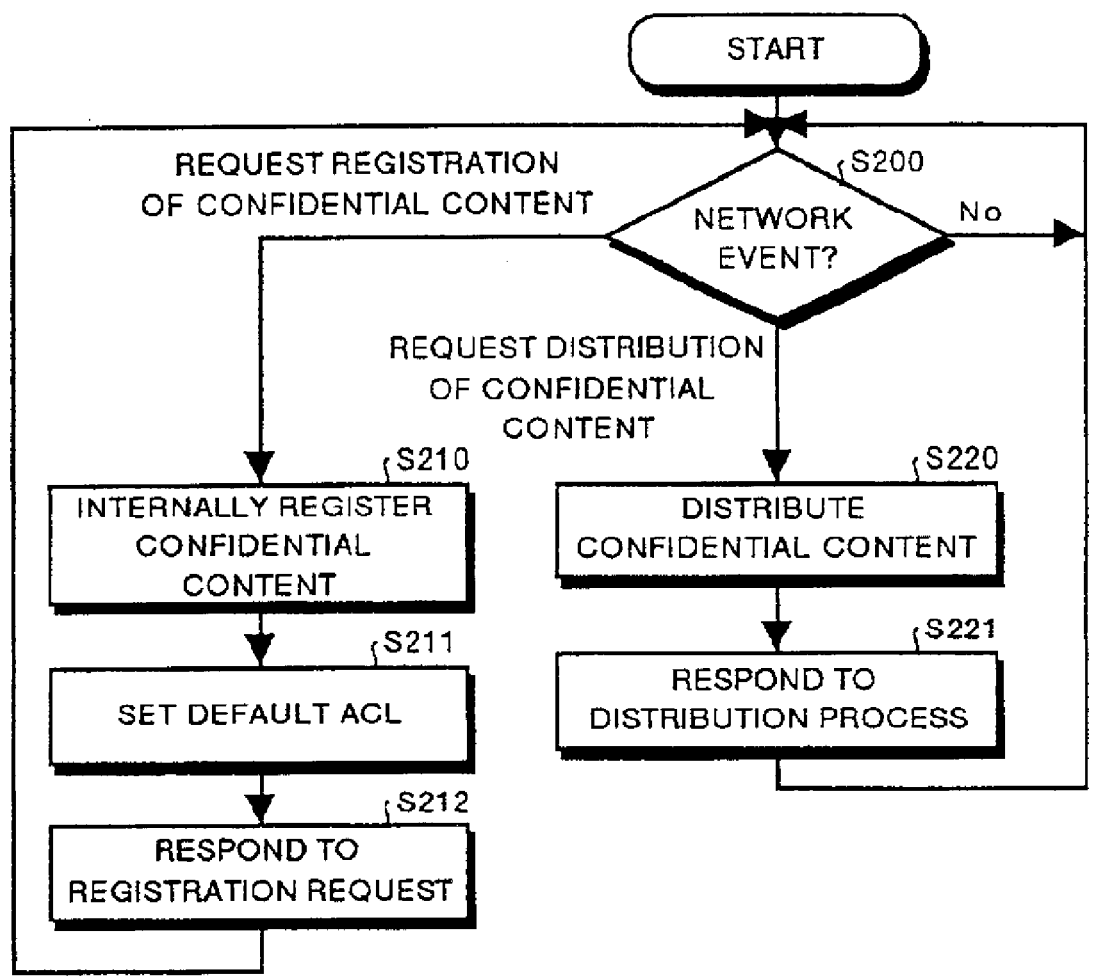
FIG. 4 is a flowchart showing the internal procedures of the process of a content server 30 shown in FIG. 1.

The internal processing procedures of the content server 30 will be explained below with reference to the flowchart of FIG. 4. The first step in FIG. 4 is for the content server 30 to determine whether a network event has been input or if input, whether it is a request for registration of the confidential content or a request for distribution of the confidential content (step S200). In the case where no network even is input (NO in step S200), on the other hand, the process of determination in step 200 is repeated.

In the case where the network event is a request for registration of the confidential content (request the registration of confidential content in step S200), the confidential content of which the registration is requested are registered internally (step S210), and a default ACL is set (step S211). A response to the request for registration of the confidential content is given to the copyright holder system 20 (step S212), followed by proceeding to step S200 for repeating the same steps.

In the case where the network event is a request for distribution of the confidential content (request the distribution of confidential content in step S200), on the other hand, the confidential content of which the distribution is requested are distributed to the user system 50 (step S220), after which the response to the request for distribution of the confidential content is sent to the user system 50 (step S221), followed by proceeding to step S200 for repeating the same steps of process. As a result, the confidential content can be distributed to the user system 50 from the copyright holder system 20 secretly through the content server 30. In this case, the traffic is distributed so that fast transfer is made possible while at the same time permitting the confidential content to be held also by the content server in the neighborhood of the user system 50 in advance. Thus, the distribution process can be increased in speed.

Figure 5:
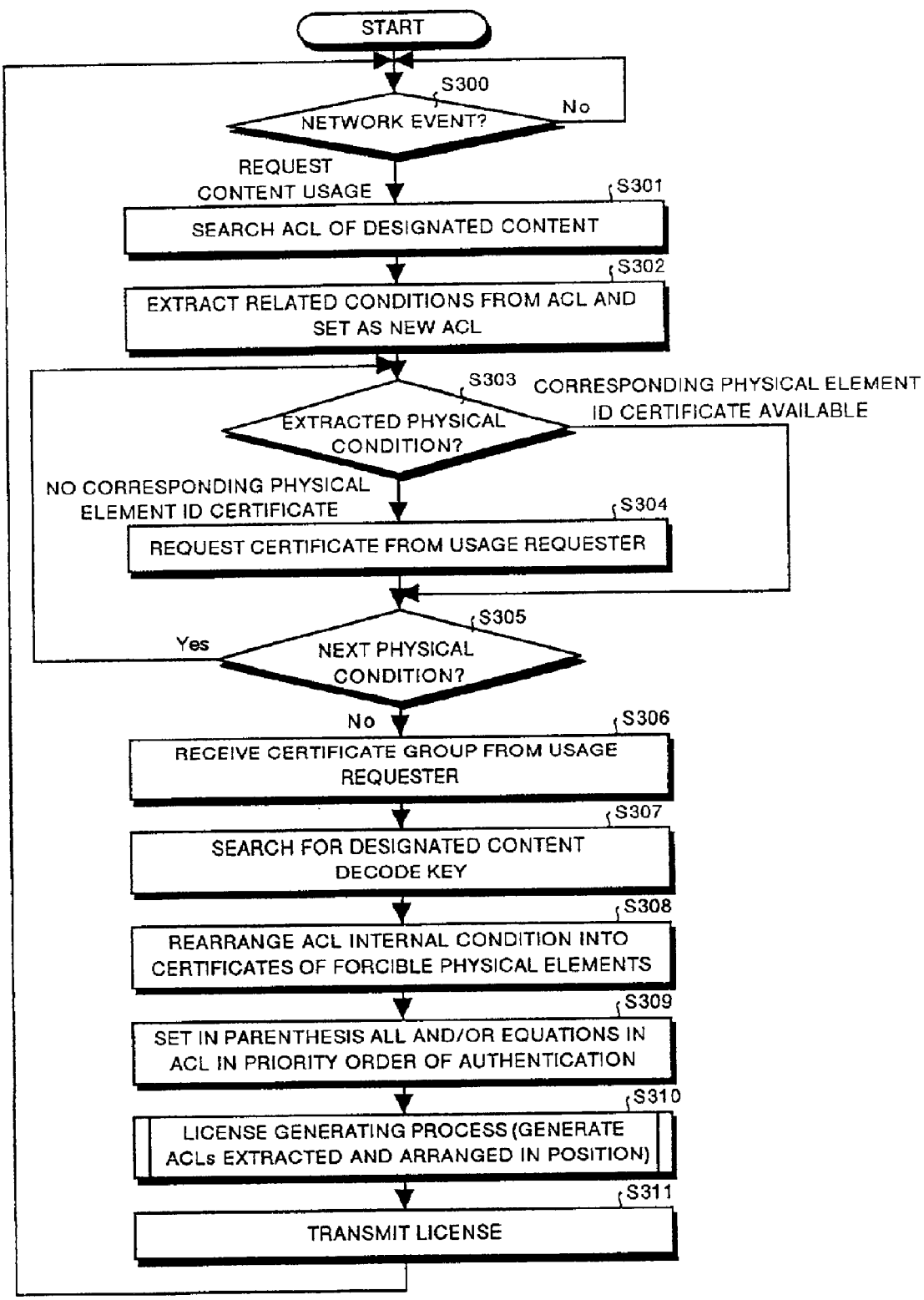
FIG. 5 is a flowchart showing the internal procedures of the process of a license server 40 shown in FIG. 1.

The internal procedures of the process of the license server 40 will be explained below with reference to the flowchart shown in FIG. 5. The first step in FIG. 5 is for the license server 40 to determine whether a network event requesting for the content usage has been input or not (step S300). In the case where no network event has been input (NO in step S300), the determination of step S300 is repeated.

In the case where the network event is a request for content usage (request content usage in step S300), the LDAP system 42 is searched for the ACL of the designated content (step S301), and further, the related access conditions are extracted from the ACL searched thereby to generate a new ACL (step S302). After that, it is determined whether there is available a corresponding physical element ID certificate corresponding to the extracted physical environment specifying condition (step S303). Thus, it is determined whether there is the next physical environment specifying condition (step S305), directly in the case where there is a corresponding physical element ID certificate (corresponding physical element ID certificate available in step S303), or after a request for the certificate is given to the content usage requester, i.e. the user system 50 (step S304) in the absence of the corresponding physical element ID certificate (no corresponding physical element ID certificate in step S303).

In the presence of the next physical environment specifying condition (YES in step S305), the process proceeds to step S303 in preparation for positively securing the corresponding physical element ID certificate, while in the absence of the next physical environment specifying condition (NO in step S305), a group of the physical element ID certificates are received from the content usage requester, i.e. the user system 50.

After that, the license permission/generating section 41 searches for the designated content decode key (step S307), and rearranges the access conditions in the ACL into the certificates of the forcible physical elements (step S308). Further, all the AND/OR equations in the ACL are defined in parentheses in the priority order of authentication (step S309). Then, the license permission/production section 41 performs the process for generating a license based on the AND/OR equations defined in the parenthesis (step S310). The license thus generated is sent to the user system 50 (step S311), and then the process proceeds to step S300 for repeating the same process.

Figure 6:
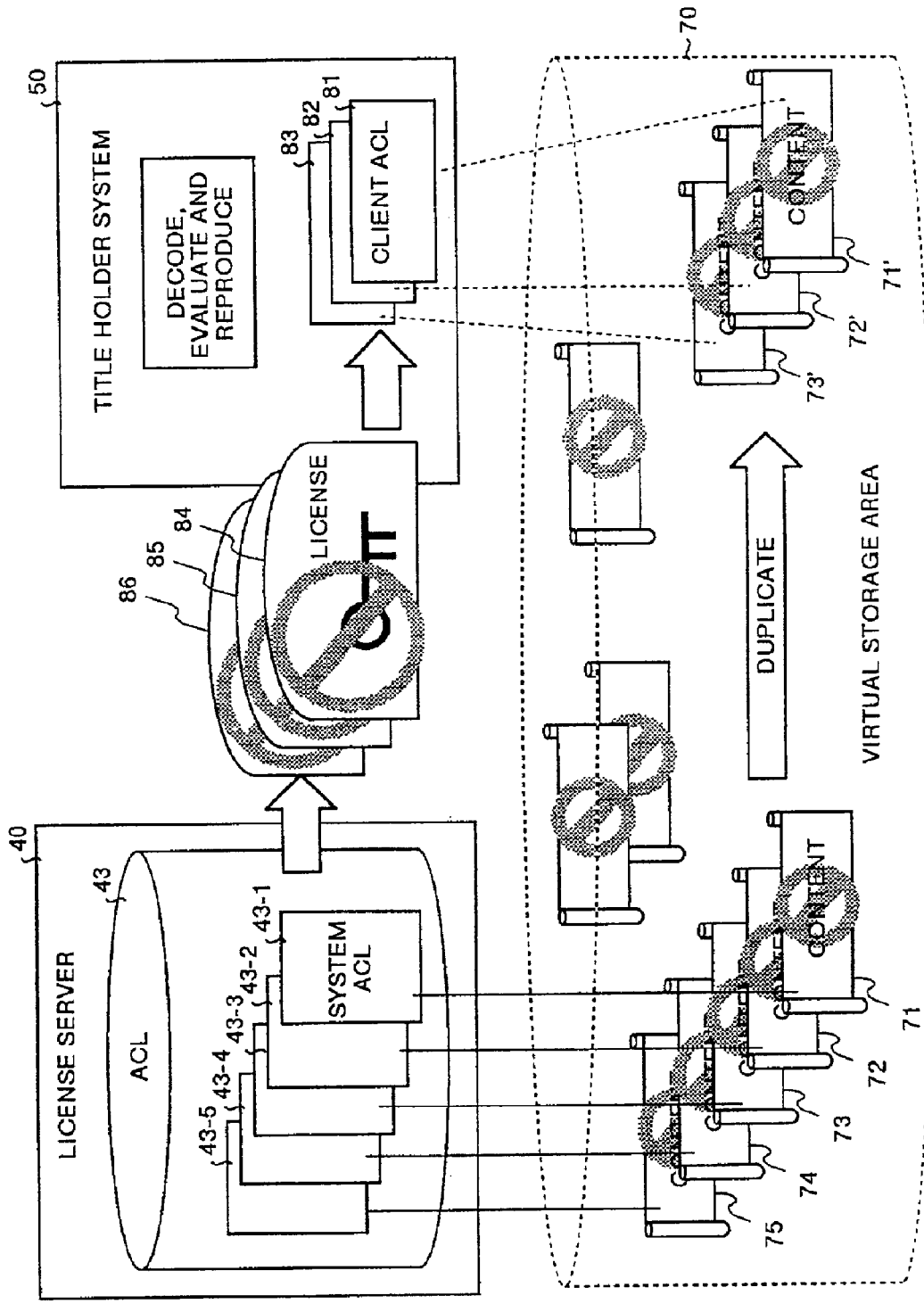
FIG. 6 is a diagram showing the relation between the license sent from the license server 40 and the confidential content sent from the copyright holder system 10 or the content server 30.

The relation between the license thus generated and the confidential content will be explained with reference to FIG. 6. FIG. 6 shows the relation between the license sent to the user system 50 from the license server 40 and the confidential content sent from the copyright holder system 20 to the user system 50 through the content server 30.

In FIG. 6, system ACLs 43-1 to 43-5 corresponding the confidential content 71 to 75, respectively, are stored in the ACL 43 of the license server 40. Based on this system ACL, licenses 84 to 86 corresponding to the confidential content 71 to 73, for example, are generated and sent to the user system. The licenses 84 to 86 are encrypted by the corresponding physical element IDs, and therefore no information leaks out. The user system 50 decodes the client ACLs 81 to 83 from the licenses 84 to 86, by decoding the corresponding confidential content 71' to 73', can obtain content, respectively.

In this case, security is sufficient since the confidential content are also encrypted. In this way, the ACLs and the confidential content, though having different transfer routes, are set in correspondence to each other while being kept in confidential state. The state of the confidential content sent through the transfer route including the content server 30 is expressed as a virtual storage area 70.

Figure 7:
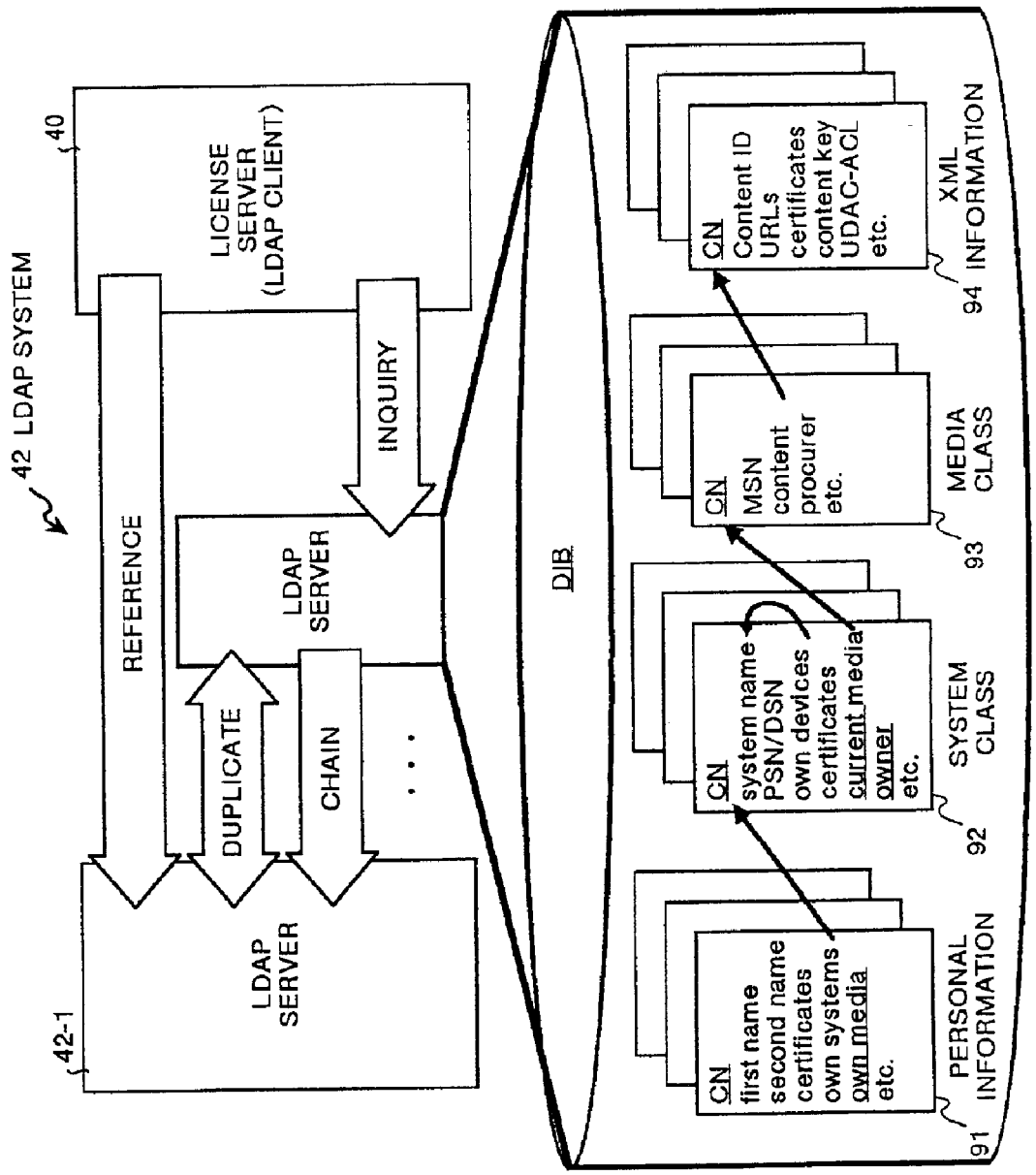
FIG. 7 is a diagram showing a configuration of an LDAP system 42 shown in FIG. 1.

The LDAP system 42 in the license server 40 will be explained with reference to FIG. 7. In FIG. 7, the LDAP system 42 has a plurality of LDAP servers, and the license server 40 is defined as a client server. Thus, each LDAP server operates under the control of the license server 40. The LDAP server is a directory server using a light-weight version of the protocol of the DAP included in X.500 providing a standard of the directory service. The interior of the LDAP server is divided into a plurality of classes including, for example, the personal information 91, the system class 92, the media class 93 and the XML information described in XML.

Assume that "own system" is searched for in the class of the personal information 91. The system class 92 is searched for this system with reference to "system name", and further, the media class 93 is searched for the present media "current media" in the system class 92. Further, the content of the media class 93 can be searched for the XML information 94 corresponding to the content. The XML information 94 has stored therein the information on the content.

Figure 8:
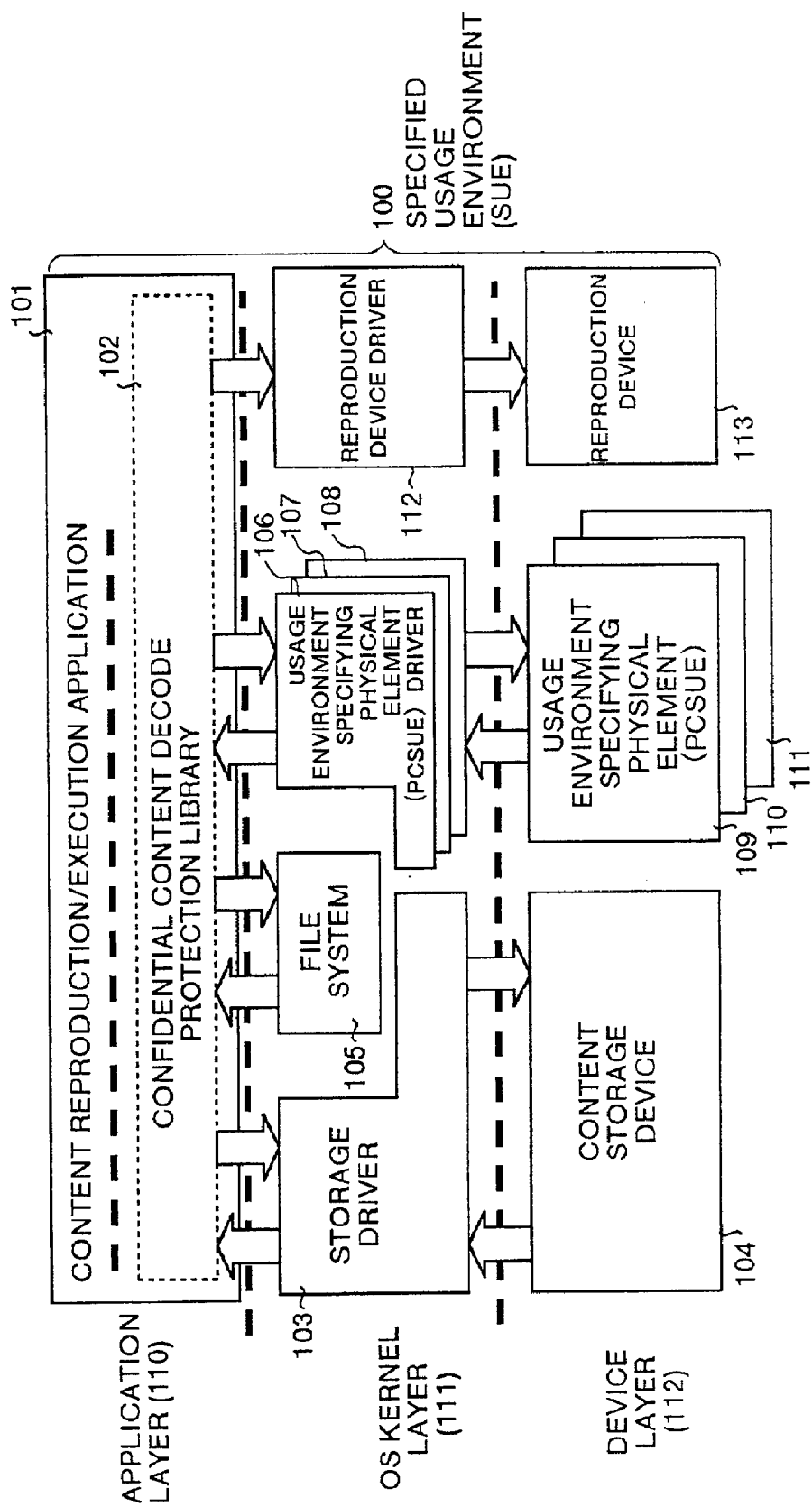
FIG. 8 is a diagram showing a layer logic structure of a specified usage environment.

In view of this, the specified usage environment of the user system 50 has a logical structure having layers shown in FIG. 8. In FIG. B, the specified usage environment 100 is configured with three layers including an application layer 110, an OS kernel layer 111 and a device layer 112, which are connected to each other by service interfaces indicated by dotted lines. The application layer 110 has a content reproduction/execution application 101, which has therein a confidential content decode protection library 102 as a program module.

The confidential content decode protection library 102 activates the storage driver 103, the file system 105, a plurality of the usage environment specifying physical element drivers 106 to 108 and the reproduction device driver. The storage driver 103 drives the content storage driver, the usage environment specifying physical element drivers 106 to 108 drive the usage environment specifying elements 109 to 111, respectively, and the reproduction device driver 112 drives the reproduction device 113. A single physical device such as an MO device can function as the content storage device 104 and the usage environment specifying element 109 at the same time.

Figure 9:
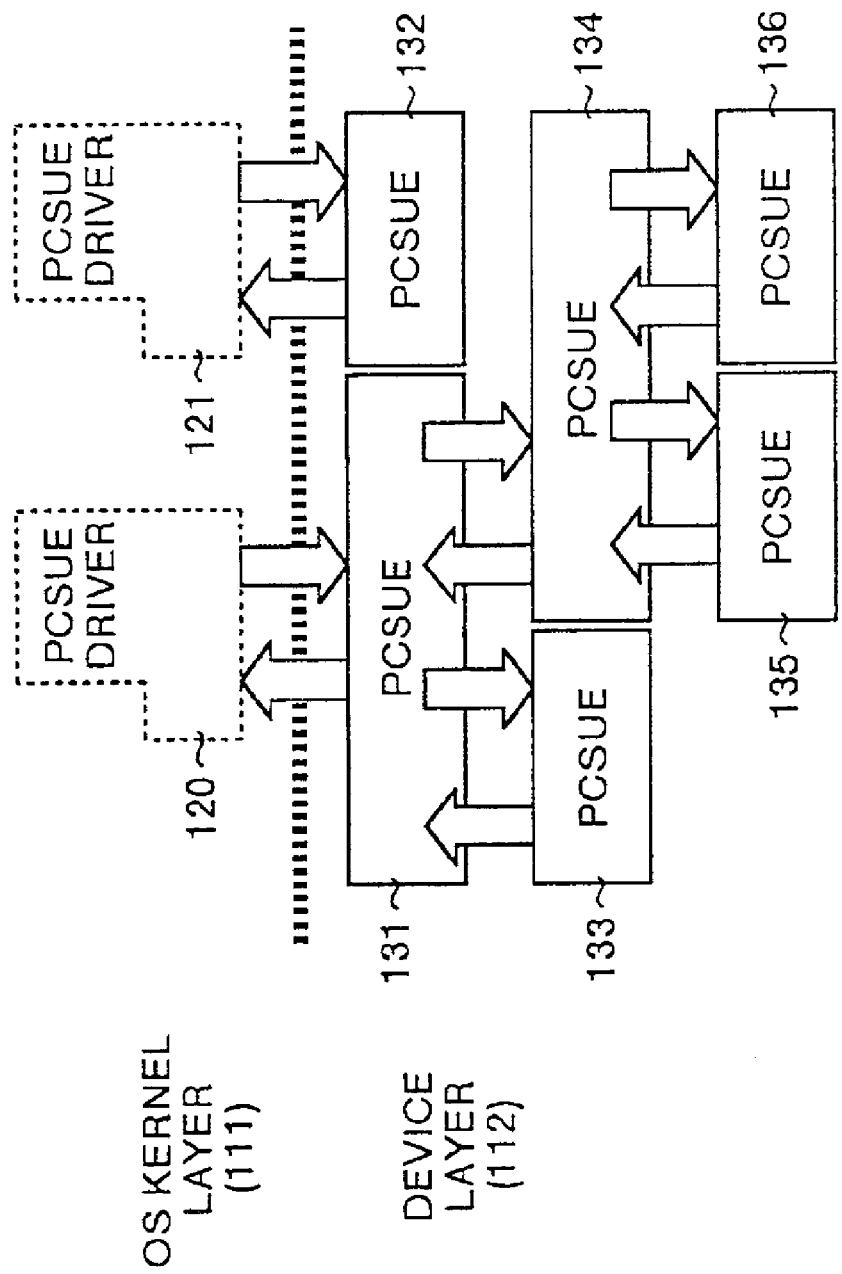
FIG. 9 is a diagram showing an example of the physical elements in a containment relationship.

FIG. 9 shows the correspondence between the OS kernel layer 111 and the device layer 112 of the usage environment specifying physical element (PCSUE). As shown in FIG. 9, the PCSUEs have an inclusion relation to each other. This is also the case of course with other devices of the device layer 112. The PCSUEs 133, 134 are located at a level lower than the PCSUE 131, for example, and the PCSUEs 135, 136 are located at a lower level than the PCSUE 134. The PCSUEs mutually having this inclusion relation can exchange information such as the physical element ID.

The PCSUE of the media reproduction section such as the DVD, for example, includes the PCSUE of the media such as the DVD, so that the content data and the media ID information are exchanged between them. The information exchange between PCSUE 134 and PCSUE 135 is an example. Only the PCSUE at the highest level exchanges data with the PCSUE driver. The relation between PCSUE driver 120 and PCSUE 131 is an example. Thus, even the devices in the same device layer may have an inclusion relation and hence a hierarchical relation to each other.

The license is information permitting a specified environment, and includes only the information unique to the client environment of which the license is requested, i.e. the environment of the user system. It is the access information including the ACL and the content decode key Kc encrypted by the physical element ID (PCSUE-ID).

An example of the multiple license is shown below.

$$\{\{\{\{\{\{<\text{access information}>\}K_5\}K_4\}K_3\}K_2\}K_1\} \quad (1)$$

where K1 to K5 are PCSUE-IDS, respectively. This license is coupled by the AND conditions using $K_1$ to $K_6$. The access information can be encrypted in multiplex way using each PCSUE-ID in the descending order of security ability of the physical elements. The decoding operation is performed sequentially from the outside PCSUE-ID.

Further, in the case where the security ability of the physical elements is substantially the same, each PCSUE-ID can be decoded by a password key resulting from the calculation of exclusive OR. For example, the formula shown below is used.

$$\{<\text{access information}>\}\{K_5 \oplus K_4 \oplus K_3 \oplus K_2 \oplus K_1\} \quad (2)$$

The multiplication of the encryption can distribute the risk of theft of the content decode key Kc which otherwise might result from the successful attack on a part of the products, i.e. a part of the physical elements.

Further, assume the case in which a plurality of PCSUE-IDs are coupled by OR operators, as shown in the formula below.

$$\{<\text{access information}>\}K_5 + \{<\text{access information}>\}K_4 + \{<\text{access information}>\}K_3 + \{<\text{access information}>\}K_2 + \{<\text{access information}>\}K_1$$

In this case, the sublicense encrypted by each PCSUE-ID or, for example, $\{<\text{access information}>\}K_1$ is generated, and the value obtained by coupling all the sublicenses by simple OR operation can be used as a license. The multiplication of the encryption described above can be applied to each sublicense, so that AND, XOR and OR operations are combined in nest relation to generate a license. This can also produce the effect of risk distribution.

Figure 10:
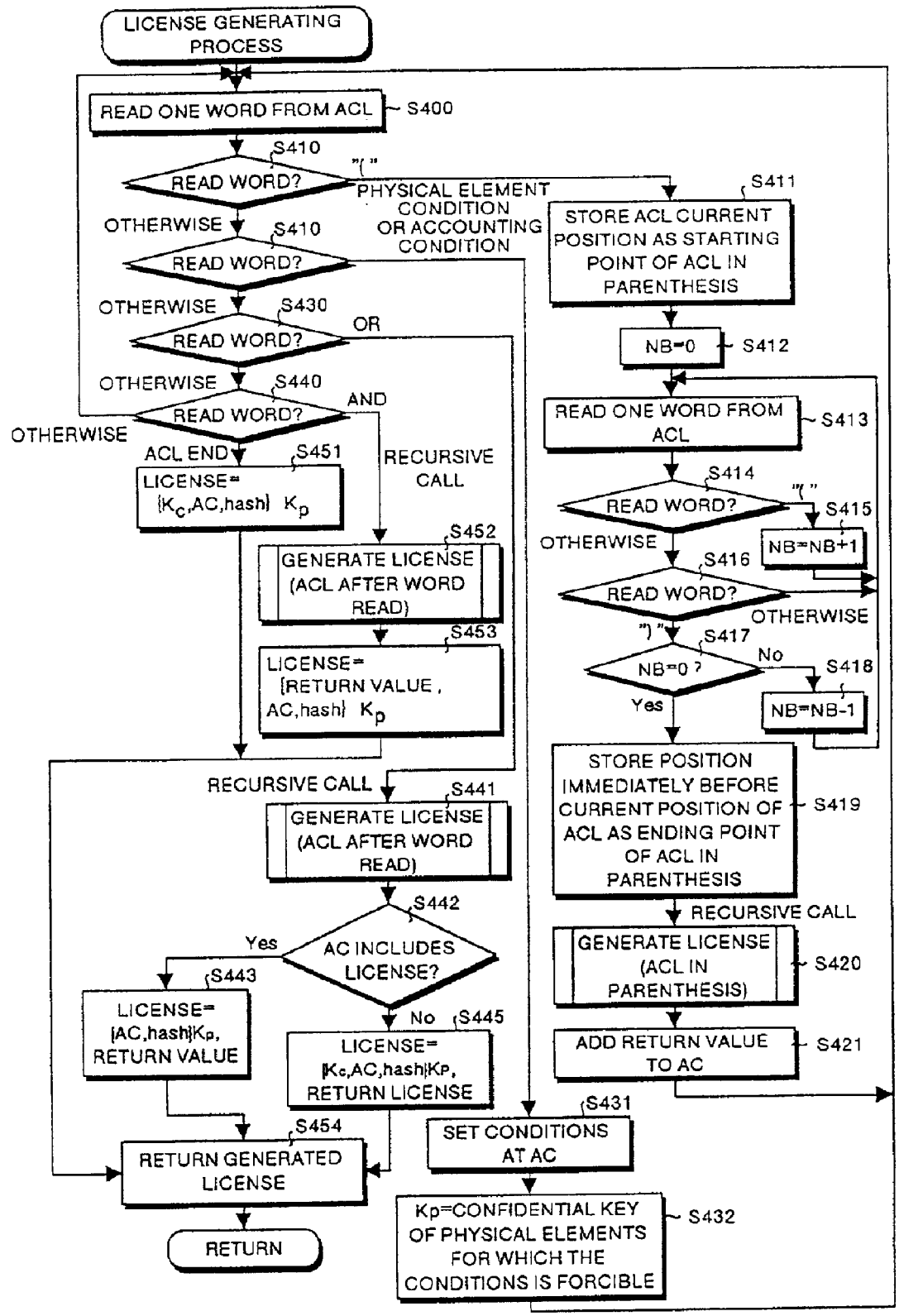
FIG. 10 is a detailed flowchart showing the procedures of the process for generating a license.

The steps of process for generating such a license will be explained with reference to the flowchart of FIG. 10. The flowchart shown in FIG. 10 represents a subroutine of the steps of the process for generating a license shown in step S310 of FIG. 5. In FIG. 10, first, one word is read out of the ACL described above (step S400). Then, it is determined whether the word read out is '(' or not (step S410).

In the case where the word read out is '(' ('(' in step D410), the current read position of the ACL is stored as a starting point of the ACL in the parenthesis (step S411). After that, the variable NB is set to zero (step S412), and further one word is read out of the ACL (step S413). Then, it is determined whether the word read out is '(' or not (step S414), and if '(', one is added to the variable NB (step S415), after which the process proceeds to step S413 for reading the next one word again.

In the case where the word read out is not '(' (OTHERWISE in step S414), on the other hand, it is determined further whether the word read out is '(' or not (step S416). In the case where the word read out is not '(', i.e. in the case where the word read is otherwise, the process proceeds to step S413, and further one word is read out of the ACL. In the case where the word read out is '(', on the other hand, it is determined whether NB is zero or not (step S417). In the case where NB is not zero (NO in step S417), one is subtracted from the NB value, and the process proceeds to step S413 for further reading out one word from the ACL.

In the case where NB is zero (YES in step S417), the position immediately before the current position of the ACL is stored as an ending point of the ACL in parenthesis (step S419). After that, the license generating process of the ACL in the parenthesis is performed (step S420), and the return value due to the recursive call thereof is added to the access conditions AC(stepS421), followed by proceeding to step S400. As a result, the ACL in the parenthesis is generated.

In the case where the word read out is not '(' (OTHERWISE in step S410), on the other hand, it is determined whether the word thus read is the physical element condition or the accounting condition (step S410). In the case where it is a physical condition or an accounting condition, the particular condition is set in the access condition AC (step S431), or the condition is set as the confidential key Kp of the forcible physical element (step S432), followed by proceeding to step S400 and one word is further read out of the ACL.

In the case where the word read out is not the physical condition or the accounting condition (OTHERWISE in step S410), it is further determined whether the word read out is "OR" or not (step S430). In the case where the word read out is "OR", the process is performed for generating a license of the ACL from and subsequent to the particular word (step S441). After that, it is further determined whether the AC is contained in the license generated (step S442), and if the AC is included (YES in step S442), a license is set for [(AC, hash) Kp, return value] using the return value for the license generating process in step S441 (step S443), and the license thus generated is returned (step S454). In the case where no AC is contained in the license (NO in step S442), on the other hand, a license is set for [{Kc, AC, hash} Kp, return value] using the return value for the license generating process in step S441 (step S445), and the license thus generated is returned (step S454).

In the case where the word read out is not "OR" (OTHERWISE in step S430), in contrast, it is further determined whether the word read out is "AND" or not (step S440). In the case where the word read out is "AND", the ACL license generating process from and after this word is performed (step S452), and a license for [{return value, AC, hash} Kp] is returned using the return value of the particular license generating process (step S454).

Further, in the case where the word read out is not "AND" (OTHERWISE in step S440), a license for [(Kc. AC, hash) Kp] is returned (step S454). As a result, a license is generated from the ACL.

Figure 11:
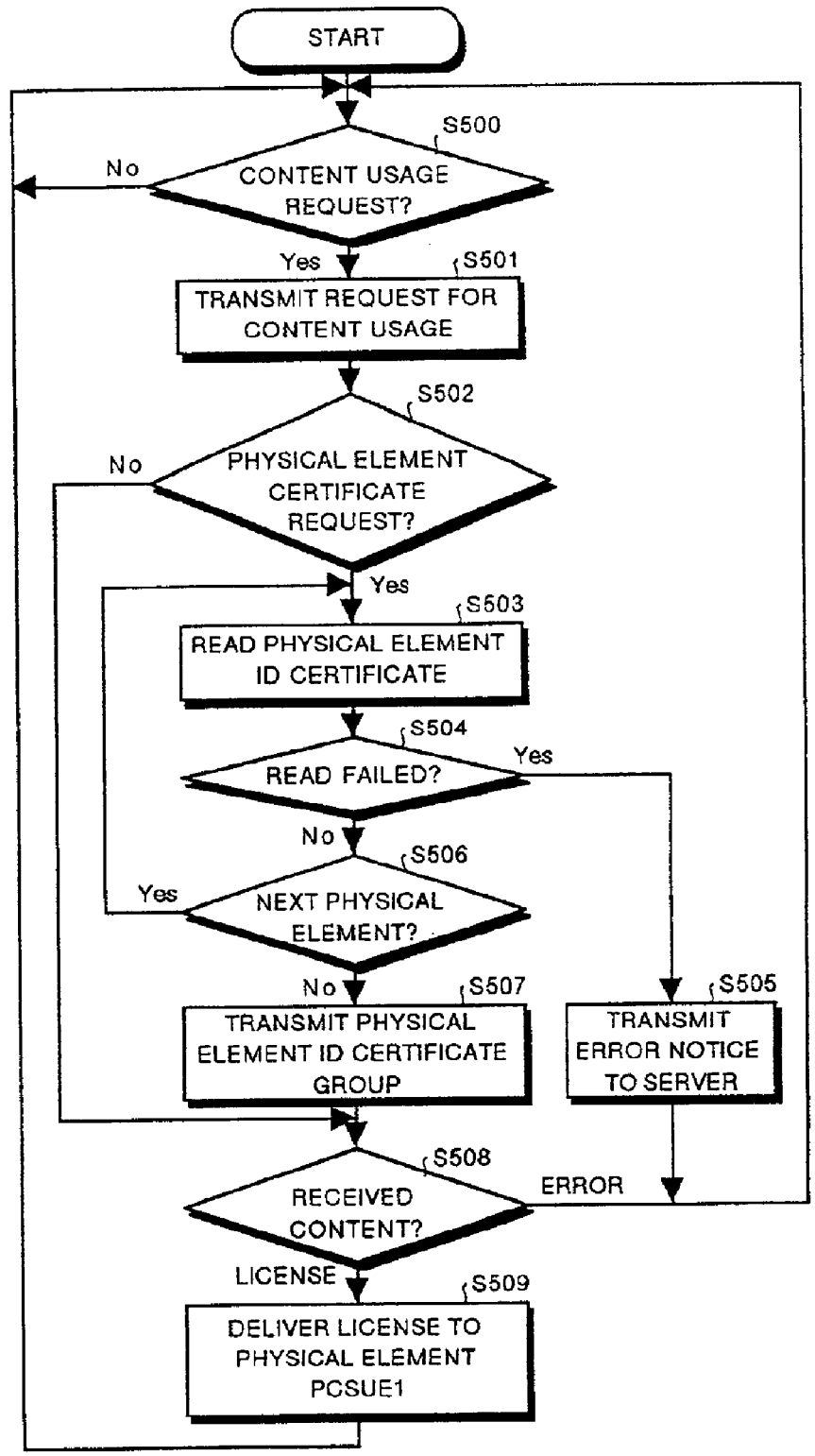
FIG. 11 is a flowchart showing the internal procedures of the process of a user system 50 shown in FIG. 1.

The internal procedures of the process of the user system 50 will be explained with reference to the flowchart shown in FIG. 11. In FIG. 11, the first step is for the user system 50 to determine whether a request for content usage has been issued or not (step S500). In the case where no request for content usage is issued (NO in step S500), the same determination process is repeated. In the case where a request for content usage is issued (YES in step S500), on the other hand, the content usage request is sent (step S501). After that, it is determined whether a request for a certificate of a physical element has been issued from the license server 40 (step S502), and if there is no request for the certificate of the physical element (NO in step S502), the process proceeds to step S508.

In the case where the request for a certificate of a physical element is issued (YES in step S502), on the other hand, the physical element ID certificate is read out (step S503), and it is determined whether the read operation has failed or not (step S504). In the case where the read operation is a failure (YES in step S504), an error notice is sent to the license server (step S505), and the process proceeds to step S500. In the case where the read operation is not a failure (NO in step S504), on the other hand, it is determined whether the next physical element is available or not (step S506), and if available (YES in step S506), the process proceeds to step S503 where the next physical element ID certificate is read out and the process described above is repeated.

In the absence of a next physical element (NO in step S506), on the other hand, a group of the physical element ID certificates are sent to the license server 40 (step S507), and it is further determined whether the received data is an error or a license (step S508). In the case where the received data is an error (ERROR in step S508), the process proceeds to step S500 for repeating the same process as described above, while in the case where the received data is a license (LICENSE in step S508), the license is further delivered to the physical element (PCSUE) 1 (step S509), followed by proceeding to step S500 to repeat the same process as described above. As a result, the user system 50 can acquire a license from the license server 40.

The PCSUE 1 is indicative of the first one of (N−1) PCSUEs. A general expression of PCSUE is PCSUEi where i is an integer of 1 to (N−1). The internal procedures of the process performed when the license is delivered to each PCSUEi will be explained with reference to the flowchart of FIG. 12.

Figure 12:
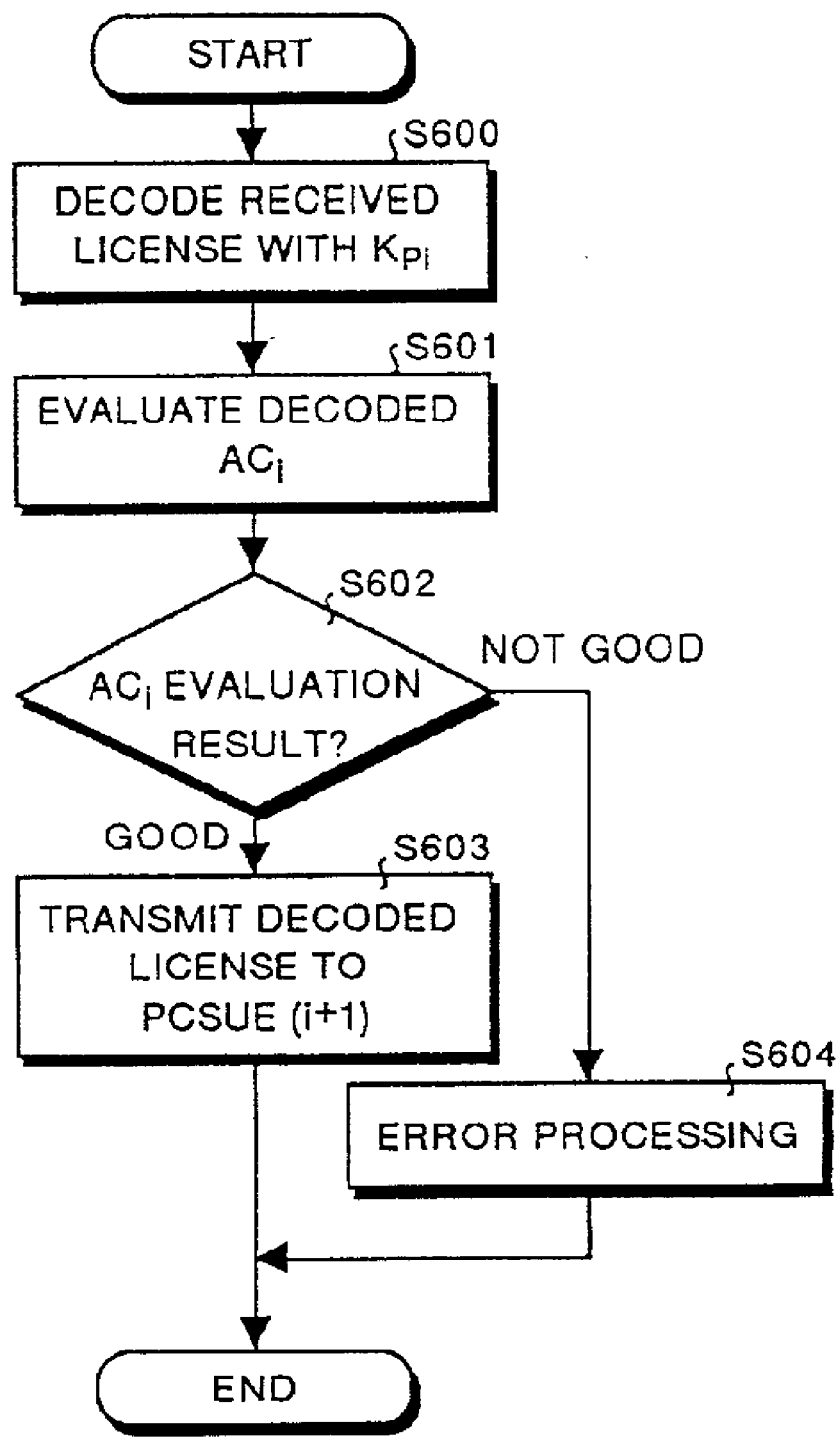
FIG. 12 is a flowchart showing the procedures of the process for decoding the license by usage relation specifying physical elements.

In FIG. 12, the first step is for the PCSUEi is to decode the received license with Kpi (step S600). After that, the decoded access condition ACi is evaluated (step S601), and it is determined whether the evaluation result of the access condition ACi is good or not (step S602). In the case where the evaluation result of the access condition ACi is not good (NOT GOOD in step S602), the error processing is effected (step S604) to end the process. In the case where the evaluation result of the access condition ACi is good (GOOD in step S602), on the other hand, the decoded license is transmitted to the PCSUE (i+1) to continue the decoding operation, thus terminating the internal processing of the PCSUEi.

Figure 13:
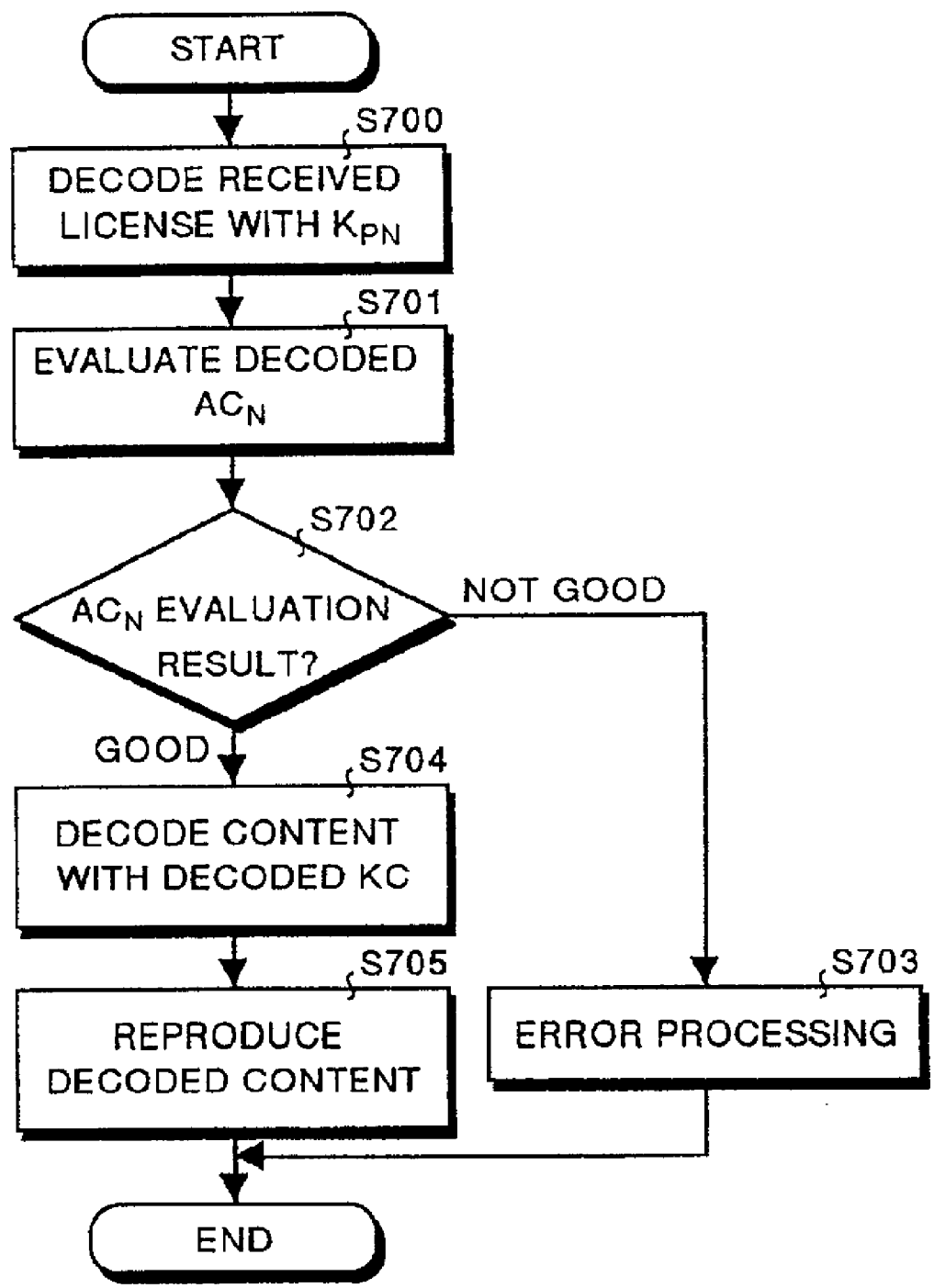
FIG. 13 is a flowchart showing the procedures of the process for decoding the license by physical elements of a reproduction device.

Then, in PCSUE(i+1), which corresponds to PCSUE(N), the physical element of the reproduction device performs the internal processing, for example. The steps of this internal processing procedure will be explained with reference to the flowchart shown in FIG. 13. In FIG. 13, the first step is to decode the received license with Kpn (step S700). After that, the decoded access condition AC(N) is evaluated (step S701), and it is determined whether the result of this evaluation is good or not (step S702). In the case where the result of evaluation is not good (NOT GOOD in step S702), the error processing is performed (step S703) thereby to end the process, resulting in the failure to decode the confidential content.

In the case where the result of evaluation of the access condition AC(N) is good (GOOD in step S702), on the other hand, the confidential content are decoded with the decoded Kc (step S704), and the decoded content are reproduced by the reproduction device (step S705) thereby to end the process.

Figure 14:
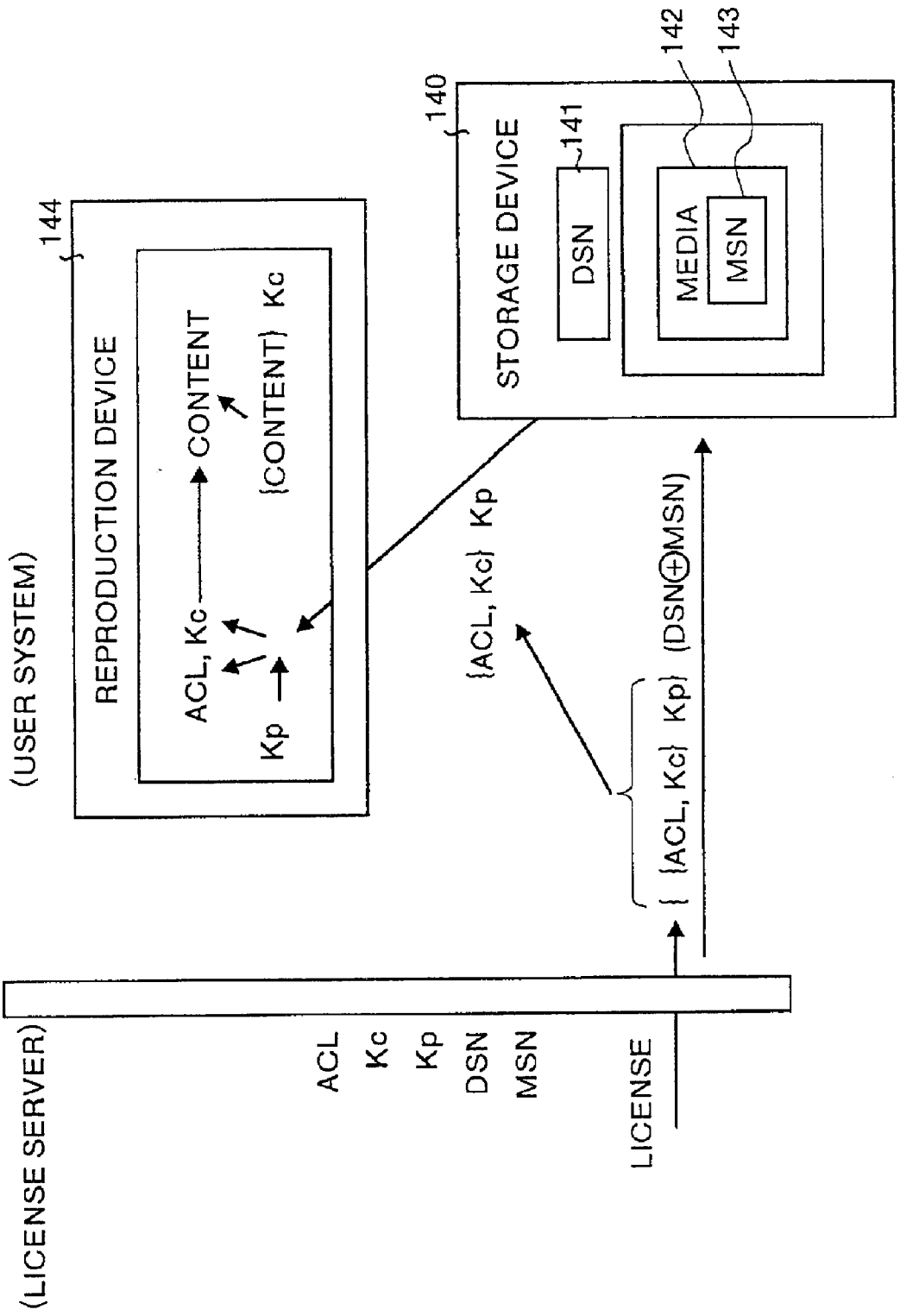
FIG. 14 is a diagram showing an example of a license decoding step.

A specific license decoding process will be explained with reference to FIG. 14. In FIG. 14, the license generated by the license server 40 is encrypted by encrypting the access control list ACL and the content decode key using the key Kp constituting the physical element ID of the reproduction device 144. The license is further encrypted using, as a key, the value of the exclusive OR of the DSN 141 constituting the serial number of the storage device and the MSN 143 constituting the serial number of the medium 142.

First, the storage device 140 reads the inhibit write MSN in the medium 142, and the exclusive OR is calculated between the same value and the DSN of the storage device 140, and according to the calculation result, the license is decoded into {ACL, Kc}Kp. This partially decoded license is sent to the reproduction device 144, which in turn decodes the license using the key Kp constituting the physical element ID of the reproduction device 144 itself, thus acquiring the access condition list ACL and the content decode key Kc. In the case where the access condition indicated by the access condition ACL is satisfied, the content decode key Kc can be used for decoding, and the decoded content are reproduced by the reproduction device 144.

Figure 15:
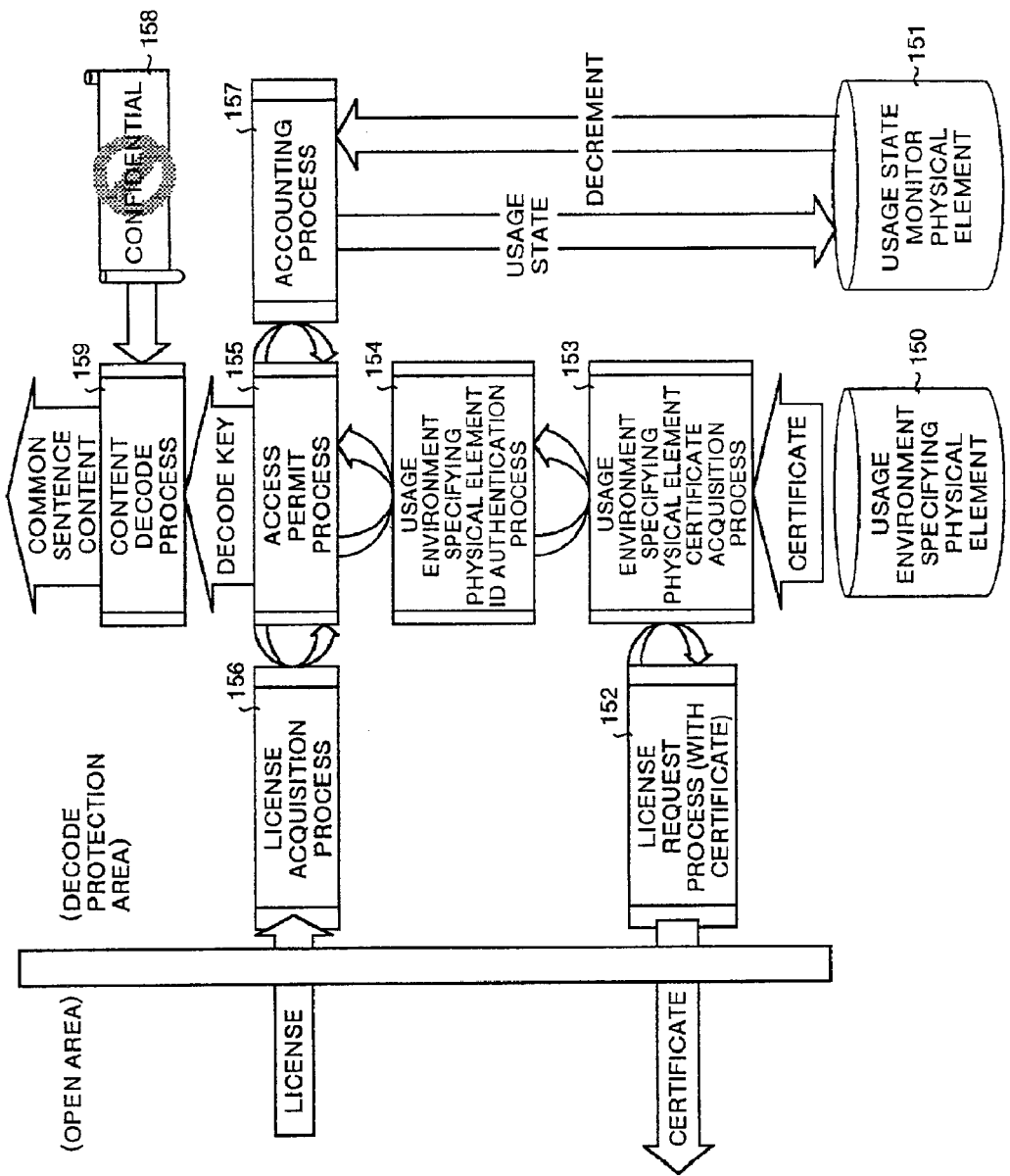
FIG. 15 is a data flow diagram showing the process of decoding the content by the request for the license and the acquisition of the license.
Figure 18:
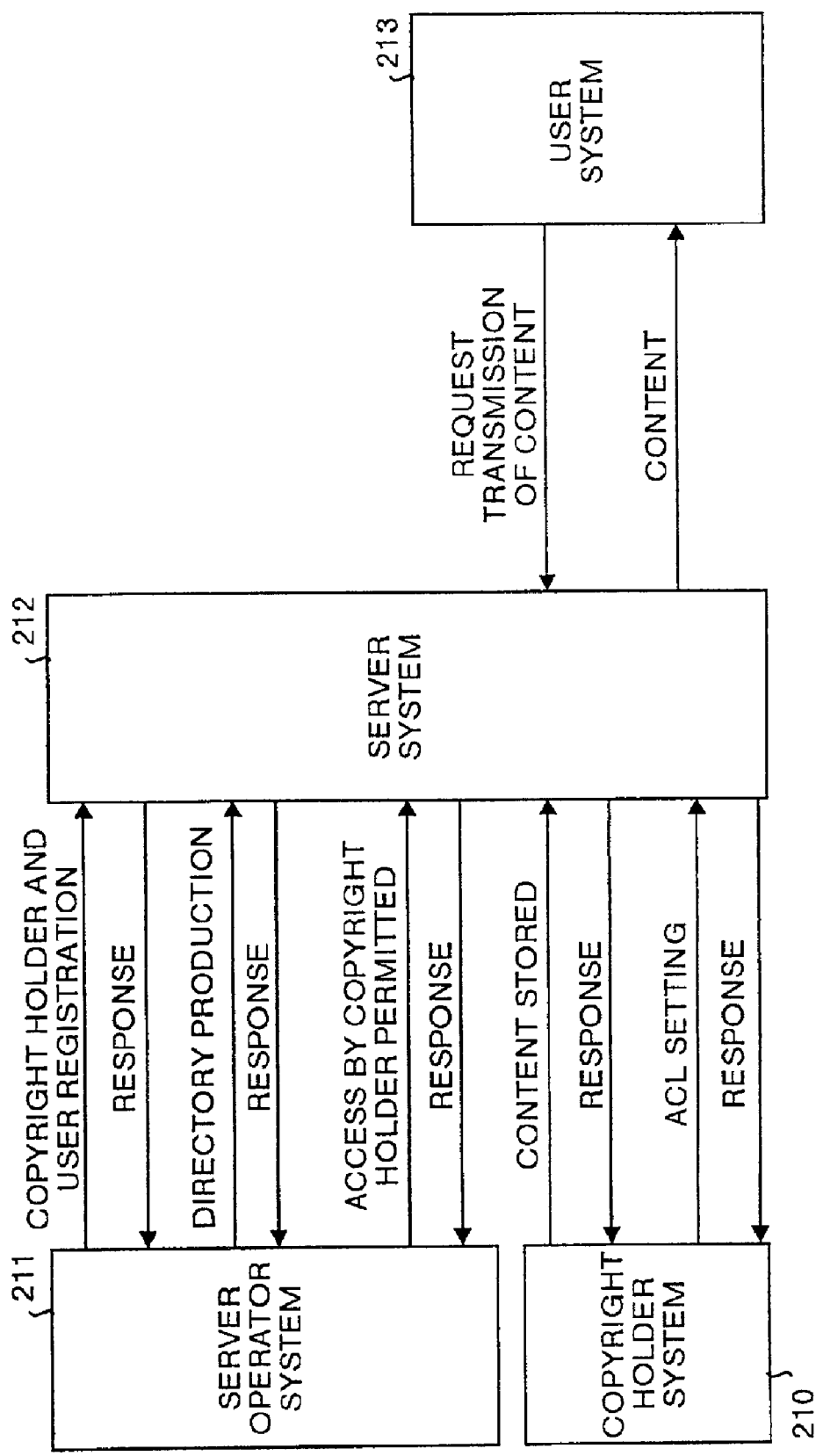
FIG. 18 is a diagram showing a general configuration of the content usage control system corresponding to the access control model according to the prior art.
Figure 19:
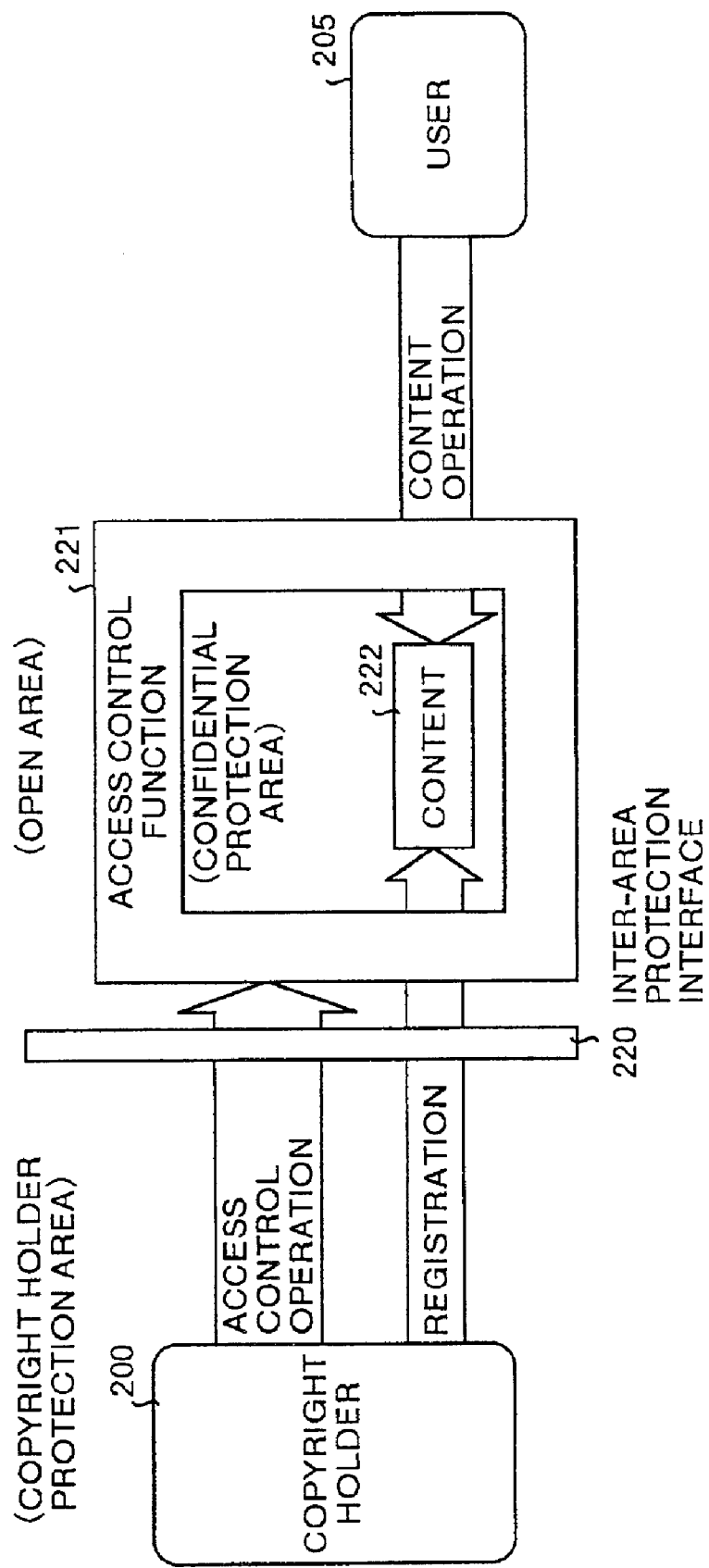
FIG. 19 is a diagram showing an improved access control model.
Figure 20:
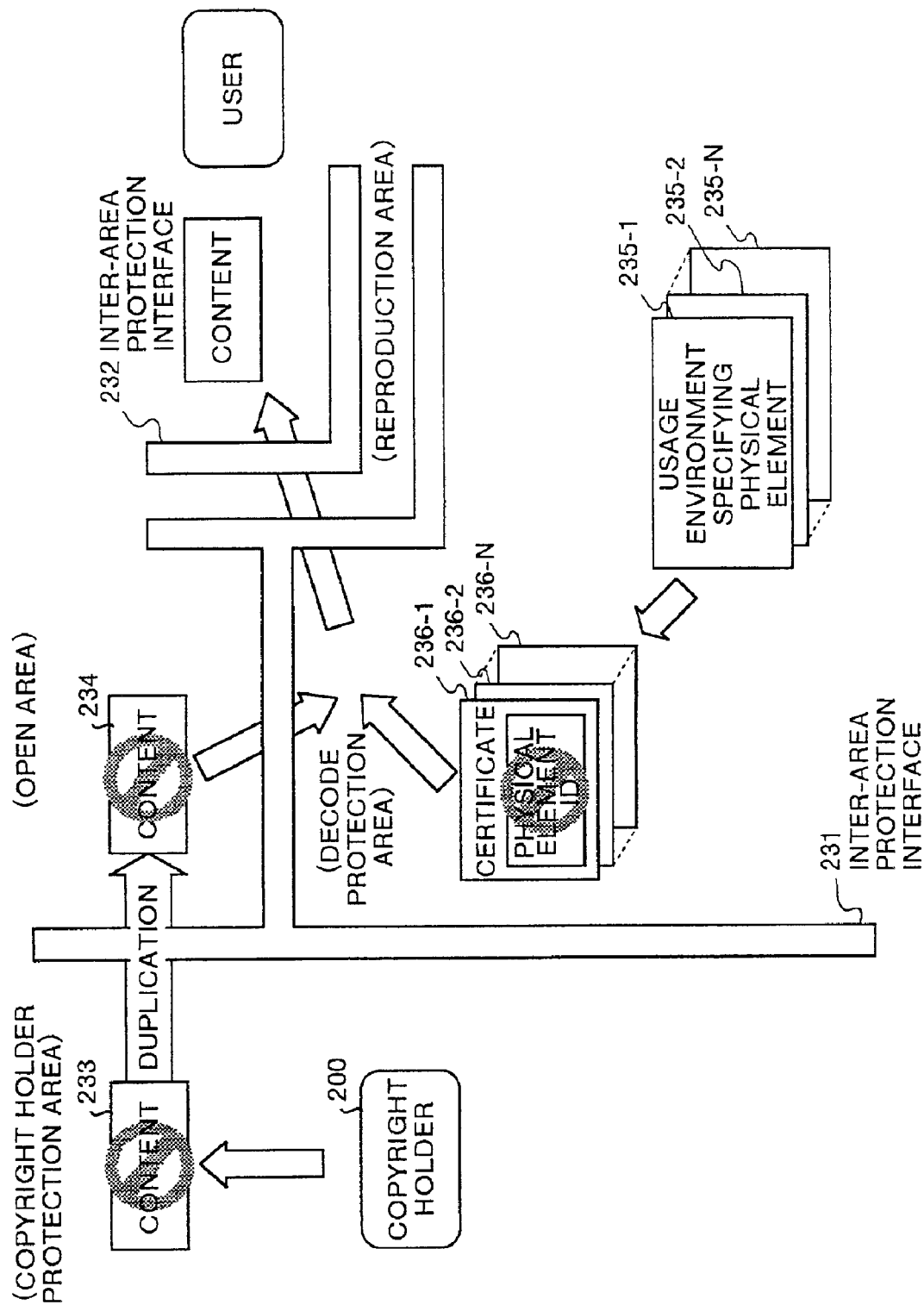
FIG. 20 is a diagram showing a content distribution model of the content usage control system according to the prior art.
Figure 21:
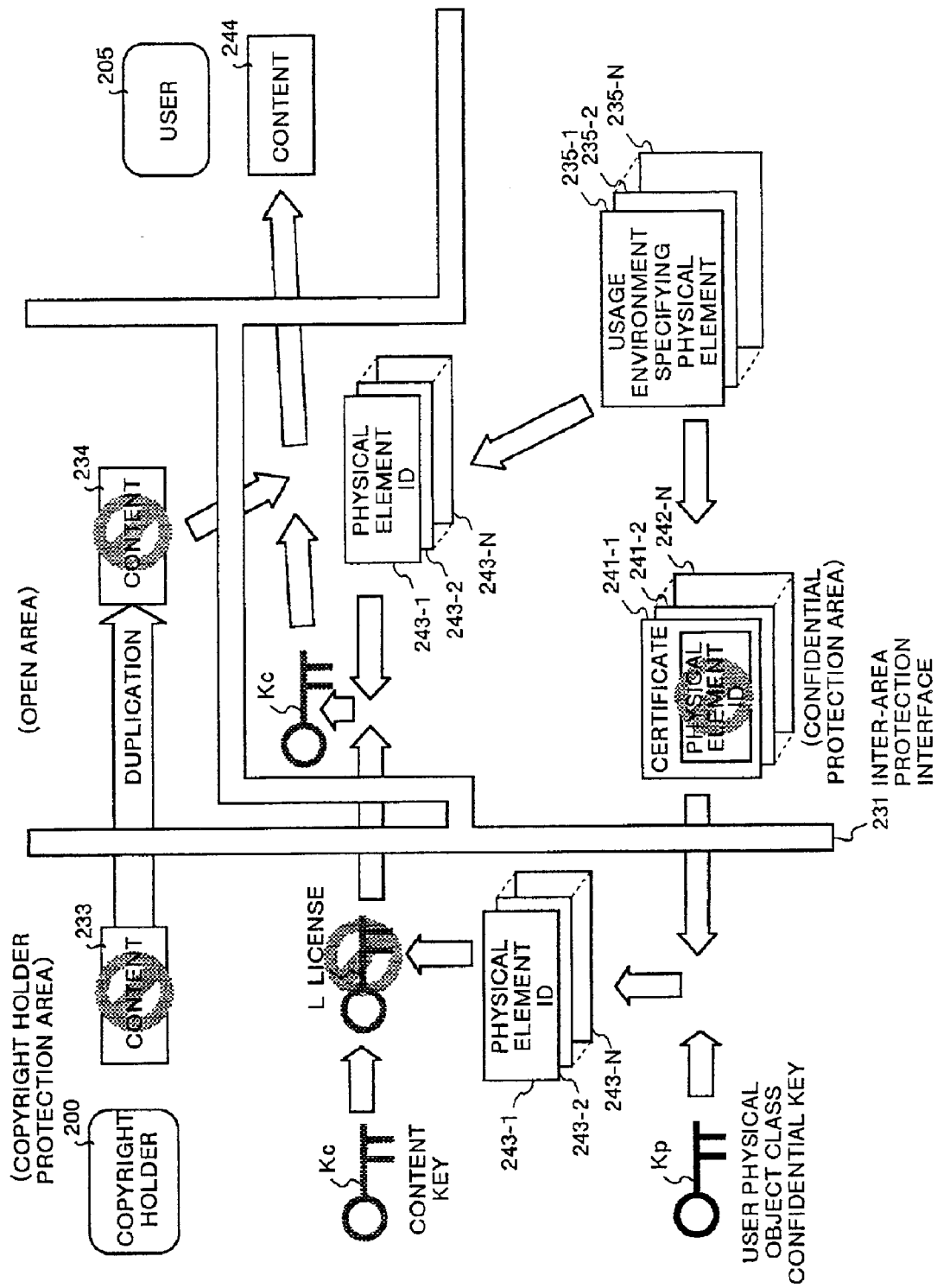
FIG. 21 is a diagram showing content cacheable model.
Figure 22:
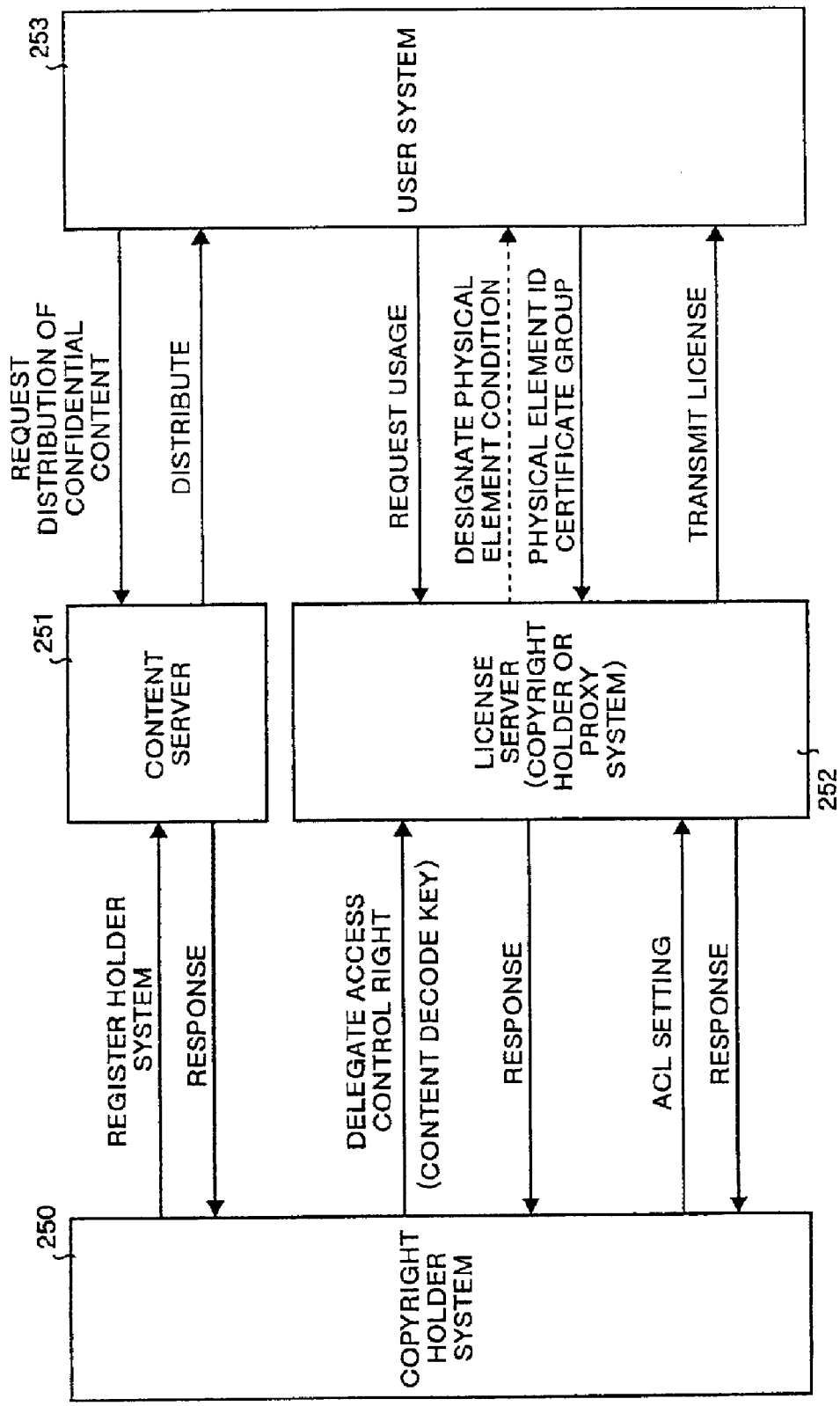
FIG. 22 is a diagram showing a general configuration of the content usage control system corresponding to the content cacheable model shown in FIG. 21.

The process of decoding the content by requesting and acquiring the license described above will be explained in more detail with reference to the data flow shown in FIG. 15. In FIG. 15, in the decode protection area of the user system 50, the license request process 152 is sent to the license server 40 with the physical element ID certificate in order to use the content. In the process, the physical element ID certificate is acquired from the usage environment specifying physical element 150 by the usage environment specifying physical element certificate acquisition process 153 and delivered by the license request process 152.

Upon transmission of the license from the license server 40, on the other hand, the license acquisition process 156 acquires the license and the access permit process 155 acquires the license from the license acquisition process 156. At the same time, the usage environment specifying physical element ID authentication process 154 acquires the physical element ID through the usage environment specifying physical element certificate acquisition process 153 and further the usage state from the accounting process 157, so that the decode key is retrieved using these results.

The content decoding process 159 decodes the confidential content 158 using the content decode key and outputs the content of ordinary sentences. The accounting process 157 notifies the usage state monitor physical element 151, whereby the current usage state is automatically decremented in accordance with the usage by the usage environment monitor physical element 151.

FIG. 16 is a diagram showing the effect that each processing step incorporated in each entity of the specified usage environment shown in FIG. 8 has on the protection ability. From this result, it is seen to be preferable to incorporate the processing steps in the device layer for generating the usage environment specifying physical element certificate and to incorporate the processing steps in the device layer with the IC card for protecting the accounting information. In this way, the protection ability is varied depending on the layer incorporating the processing steps. Therefore, each processing function shown in FIG. 15 is required to be incorporated taking the layer arrangement into consideration.

In the foregoing explanation of embodiments, what is called the content cacheable model is used as a standard configuration. However, the invention is not limited to such a configuration, but a content simultaneous distribution model can be apparently also used as a standard configuration. In such a configuration, the content server 30 is regarded to have been arranged in the license server 40.

Further, the foregoing embodiments assume the use of a key as a prerequisite for encryption and decoding. In such a case, either the confidential key encryption method or the public key encryption method can be used appropriately in accordance with the individual systems to which the invention is applicable.

Further, the physical elements shown in the embodiments described above include portable recording media such as the CD-ROM, DVD, MO, IC card and floppy disk used with the user system, as well as the device unique to the user system 50. The user system using such a portable recording medium includes not only the physical elements unique to the user system but also the portable recording medium as a physical element for controlling the usage of the content. The media unique to the user system 50, such as a built-in hard disk drive or a built-in ROM is of course also included in the physical elements described above.

As described above, in one aspect of this invention, the setting unit sets a license as a structure expressed by combinations of logic sums and logic products of a plurality of partial licenses for the content based on the ID information of the physical elements of the user unit including the media used in the user unit and the ID information of the user, and the usage control unit controls the usage of the content by the user unit based on the license set by the setting unit, thereby making versatile usage control possible based on the license. Therefore, a versatile content usage control based on the license conditions is made possible.

Further, the partial licenses set by the setting unit include the accounting conditions constituting the conditions for the category changing in accordance with the usage state of the user unit and the user. Therefore, the content usage control can be effected in more finely detailed fashion and versatile way for users.

Further, the production unit produces, at the content the license information encrypted from the license and the content decode key by the ID information of a plurality of physical elements of the user unit including the media used in the user unit, and the user unit decodes the license information sent in accordance with the content usage request based on the ID information of the physical elements due to the user unit, so that in the case where the license conditions are satisfied, the encrypted content are decoded using the content decode key. Therefore, the content usage control with high protection ability is realized.

Further, in the case where the interface between the partial licenses in the license is described with the logic product, the encryption based on the ID information of the physical elements corresponding to the partial licenses is multiplied, thereby making it possible to distribute the risk of theft of the content decode key as a result of successful attack on a part of the physical elements.

Further, physical elements contained in a physical element are handled as a single physical element, of which the illegal use is not permitted, thereby making it possible to distribute the risk of theft of the content decode key.

Further, the content server holds the content encrypted by the authorized information supplier unit on the open network, and upon receipt of a request from the user unit for content distribution, sends the encrypted content to the user unit. As a result, the traffic jam is prevented in the system by making the most of the open network thereby making it possible to acquire the content quickly.

In another aspect of this invention, the setting unit sets by storing in the condition storage unit of the usage control unit the license conditions expressed as a structure by a combination of logic sums and logic products of a plurality of partial licenses for the content based on the ID information of the physical elements of the user unit including the media used in the user unit and the ID information of the user, and holds the decode key for the same content in the holding unit. The extraction unit receives the content usage request from the user unit, extracts the license conditions and the content decode key corresponding to the user unit, and based on the ID information of the physical elements sent from the user unit, produces the license conditions encrypted from the license conditions and the content decode key and sends the resulting license information to the user unit. The user unit decodes the license information sent thereto in accordance with the content usage request, based on the ID information of the physical elements due to the user unit and in the case where the license conditions are satisfied, decodes the encrypted content using the content decode key. Therefore, the encryption and decoding for the versatile content usage control can be specifically realized.

In still another aspects of this invention, the request unit transmits the ID information of the physical elements of the content usage apparatus and the ID information of the user to the content management device in accordance with the content usage request, after which the license information sent by the content management device in response to the content usage request are decoded based on the ID information of the physical elements of the content usage apparatus thereby to determine the license conditions and the content decode key, and when permitted upon determination of the particular license conditions, decodes the content using the decode key, thereby improving the protection ability. Therefore, the content usage control with high protection ability is made possible.

In still another aspect of the invention, first, the license conditions and the content decode key are determined by decoding the license information of the content in response to the content usage request, based on the ID information of the physical elements of the content usage apparatus, and when permitted upon determination of the license conditions, the content are decoded using the decode key, thereby improving the protection ability. Therefore, the content usage control with higher protection ability is made possible.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A content usage control system which controls the usage of content supplied by an authorized information supplier including a content producer who is also an information producer and those persons authorized by the information producer, said system comprising:

a user unit which enables a user to use the content, said user unit including a plurality of physical elements;

a setting unit which sets a license as a structure expressed by a combination of logic sums and logic products of a plurality of partial licenses for the content based on ID information of the physical elements of said user unit including media used in said user unit and ID information of the user; and a usage control unit which controls the usage of the content by said user unit by using license information that is encrypted in a multiplex way in a predetermined order, at the request of the user unit intending to use the content, from the license set by said setting unit and a content decode key by the ID information of the physical elements through which the license information is passed in sequence until the content is decoded by use of the content decode key, wherein the license information is partially decoded by one of said physical elements, in inverse to said predetermined order, and then said partially decoded license information is sent to another of said physical elements to be decoded.

2. The content usage control system according to claim 1, wherein the partial licenses set by said setting unit include an accounting condition constituting the condition for a category changing with a usage state of said user unit and the user.

3. The content usage control system according to claim 1, in which said user unit decodes the license information sent in accordance with the content usage request, based on the ID information of the physical elements of the user unit when the license information is passed to each of the physical elements in sequence, and in the case where the license conditions are satisfied, the encrypted content is decoded by use of the content decode key.

4. The content usage control system according to claim 1, wherein said usage control unit encrypts by multiplexing the ID information of the physical elements corresponding to the partial licenses of the license in the case where an interface of the partial licenses is described by the logic product.

5. The content usage control system according to claim 1, wherein the physical elements include those included in other physical elements.

6. The content usage control system according to claim 1, further comprising a content server which holds the content encrypted by the authorized information supplier on an open network, and sends the encrypted content to said user unit upon receipt of a request to distribute the content from said user unit.

7. A content usage control system which controls the usage of content supplied by an authorized information supplier including a content producer who is also an information producer and persons authorized by the information producer, said system comprising:

a user unit which requests usage of the content, and decodes the encrypted content using a content decode key in the case of satisfying license conditions obtained by decoding license information, that is encrypted in a multiplex way in a predetermined order, sent in accordance with a content usage request, based on ID information of the physical elements of the user unit when the license information is passed to each of the physical elements in sequence, said user unit including a plurality of physical elements;

a setting unit which sets a license expressed as a structure by a combination of logic sums and logic products of a plurality of partial licenses for the content based on the ID information of the physical elements of said user unit including media used in said user unit and ID information for the user;

a conditions storage unit, which stores the license conditions, set by said setting a holding unit which holds said content decode key;

an extraction unit which receives the content usage request from said user unit and extracts the license conditions and said content decode key corresponding to said user unit; and a production unit which produces the license information by encrypting the license conditions and said content decode key based on the ID information of the physical elements through which the license information is passed in sequence until the content is decoded by use of the content decode key and sends the license information to said user unit;

wherein the license information is partially decoded by one of said physical elements, in inverse to said predetermined order, and then said partially decoded license information is sent to another of said physical elements to be decoded.

8. A content usage apparatus connected to a network for enabling a user to use the content, said apparatus comprising:

a request unit which transmits ID information of physical elements of said content usage apparatus and ID information of the user to an external content management apparatus which manages the content in response to a content usage request;

a unit which decodes license information, that is encrypted in a multiplex way in a predetermined order transmitted by said content management apparatus in response to the content usage request, using the ID information of the physical elements of said content usage apparatus when the license information is passed to each of the physical elements in sequence, and determines license conditions and a content decode key; and a unit which decodes the content using the content decode key when permitted upon determination that the license has been obtained;

wherein the license information is partially decoded by one of said physical elements, in inverse to said predetermined order, and then said partially decoded license information is sent to another of said physical elements to be decoded.

9. A computer readable recording medium which stores a program executed by a computer of a content usage apparatus connected to a network for enabling a user to use the content, said program being intended to perform operations comprising the steps of:

transmitting ID information of physical elements of said content usage apparatus and ID information of a user to an external content management apparatus which manages the content in accordance with a content usage request;

determining license conditions and a content decode key by decoding license information, that is encrypted in a multiplex way in a predetermined order, transmitted by said external content management apparatus in response to the content usage request, using the ID information of the physical elements of said content usage apparatus when the license information is passed to each of the physical elements in sequence; and decoding the content using the content decode key when permitted upon determination of the license conditions;

wherein the license information is partially decoded by one of said physical elements, in inverse to said predetermined order, and then said partially decoded license information is sent to another of said physical elements to be decoded.

10. A content usage apparatus enabling a user to use the content, said apparatus comprising:

a unit which determines, in response to a content usage request, license conditions and a content decode key by decoding license information that is encrypted in a multiplex way in a predetermined order, for the content based on ID information of physical elements of said content usage apparatus when the license information is passed to each of the physical elements in sequence; and a unit which decodes the content by use of the content decode key when permitted upon satisfaction of the license conditions determined;

wherein the license information is partially decoded by one of said physical elements, in inverse to said predetermined order, and then said partially decoded license information is sent to another of said physical elements to be decoded.

11. A computer readable recording medium which stores a program executed by a computer of a content usage apparatus for enabling a user to use the content, said program being intended to perform operations comprising the steps of:

determining, in response to a content usage request, license conditions and a content decode key by decoding license information, that is encrypted in a multiplex way in a predetermined order, of the content based on ID information of physical elements of said content usage apparatus when the license information is passed to each of the physical elements in sequence; and decoding the content using the content decode key when permitted upon determination of the license conditions;

wherein the license information is partially decoded by one of said physical elements, in inverse to said predetermined order, and then said partially decoded license information is sent to another of said physical elements to be decoded.

12. A program, encoded in a computer readable medium, executed by a computer of a content usage apparatus connected to a network for enabling a user to use the content, said program being intended to perform operations comprising the steps of:

electronically transmitting ID information of physical elements of said content usage apparatus and ID information of the user to an external content management apparatus, which manages the content in accordance with a content usage request;

determining license conditions and a content decode key by decoding license information, that is encrypted in a multiplex way in a predetermined order, transmitted by said external content management apparatus in response to the content usage request, using the ID information of the physical elements of said content usage apparatus when the license information is passed to each of the physical elements in sequence; and electronically decoding the content using the content decode key when permitted upon determination of the license conditions;

wherein the license information is partially decoded by one of said physical elements, in inverse to said predetermined order, and then said partially decoded license information is sent to another of said physical elements to be decoded.

13. A content usage method employed on a content usage apparatus connected to a network for enabling a user to use the content, said method comprising:

electronically transmitting ID information of physical elements of said content usage apparatus and ID information of the user to an external content management apparatus, which manages the content in accordance with a content usage request;

electronically determining license conditions and a content decode key by decoding license information, that is encrypted in a multiplex way in a predetermined order, transmitted by said external content management apparatus in response to the content usage request, using the ID information of the physical elements of said content usage apparatus when the license information is passed to each of the physical elements in sequence; and electronically decoding the content using the content decode key when permitted upon determination of the license conditions;

wherein the license information is partially decoded by one of said physical elements, in inverse to said predetermined order, and then said partially decoded license information is sent to another of said physical elements to be decoded.

14. A program, encoded in a computer readable medium, executed by a computer of a content usage apparatus for enabling a user to use the content, said program being intended to perform operations comprising the steps of:

electronically determining, in response to a content usage request, license conditions and a content decode key by decoding license information, encrypted in a multiplex way in a predetermined order, of the content based on ID information of physical elements of said content usage apparatus when the license information is passed to each of the physical elements in sequence; and electronically decoding the content using the content decode key when permitted upon determination of the license conditions;

wherein the license information is partially decoded by one of said physical elements, in inverse to said predetermined order, and then said partially decoded license information is sent to another of said physical elements to be decoded.

15. A content usage method employed on a content usage apparatus for enabling a user to use the content, said method comprising:

electronically determining, in response to a content usage request, license conditions and a content decode key by decoding license information, that is encrypted in a multiplex way in a predetermined order, of the content based on ID information of physical elements of said content usage apparatus when the license information is passed to each of the physical elements in sequence; and electronically decoding the content using the content decode key when permitted upon determination of the license conditions;

wherein the license information is partially decoded by one of said physical elements, in inverse to said predetermined order, and then said partially decoded license information is sent to another of said physical elements to be decoded.

16. The content usage method of claim 15 wherein the license information includes accounting condition constituting the condition of a category changing with a usage state of said user unit and the user.

* * * * *